(12) United States Patent
Ohnishi

(10) Patent No.: US 10,589,544 B2
(45) Date of Patent: Mar. 17, 2020

(54) PRINTING APPARATUS AND PRINTING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/075,147

(22) PCT Filed: Feb. 3, 2017

(86) PCT No.: PCT/JP2017/004025
§ 371 (c)(1),
(2) Date: Aug. 3, 2018

(87) PCT Pub. No.: WO2017/135425
PCT Pub. Date: Aug. 10, 2017

(65) Prior Publication Data
US 2018/0370253 A1  Dec. 27, 2018

(30) Foreign Application Priority Data

Feb. 4, 2016 (JP) .................... 2016-020063
Dec. 20, 2016 (WO) ................ PCT/JP2016/087981

(51) Int. Cl.
*B41J 11/00* (2006.01)
*B41J 11/46* (2006.01)
(Continued)

(52) U.S. Cl.
CPC ............. *B41J 11/002* (2013.01); *B41J 2/195* (2013.01); *B41J 3/28* (2013.01); *B41J 3/4078* (2013.01);
(Continued)

(58) Field of Classification Search
CPC ..... B41J 2/01; B41J 2/195; B41J 2/211; B41J 2/2114; B41J 11/005; B41J 11/0015;
(Continued)

(56) References Cited

U.S. PATENT DOCUMENTS

2003/0064206 A1\* 4/2003 Koyano et al. ............... 428/195
2008/0192100 A1\* 8/2008 Nakajima ..................... 347/102
2008/0225100 A1\* 9/2008 Kumagai ...................... 347/102

FOREIGN PATENT DOCUMENTS

JP   H09124965    5/1997
JP   2001192590   7/2001
(Continued)

OTHER PUBLICATIONS

"International Search Report (Form PCT/ISA/210) of PCT/JP2017/004025," dated Mar. 28, 2017, with English translation thereof, pp. 1-4.

*Primary Examiner* — Juanita D Jackson
(74) *Attorney, Agent, or Firm* — JCRIPRNET

(57) ABSTRACT

To suppress the risk of ink bleeding and thereby attain an improved printing quality, a printing apparatus is provided that carries out an inkjet printing operation for a medium. The printing apparatus includes inkjet heads that eject droplets of ink using inkjet technique; and ultraviolet light sources that radiate ultraviolet light. The ink ejected from the inkjet heads contains an ultraviolet absorbent that absorbs ultraviolet light, and a solvent that dissolves or disperses the ultraviolet absorbent. The ejected ink is adherable to the medium and fixable by evaporating the solvent. The ultraviolet light sources irradiate the ink adhered to the medium with ultraviolet light so as to volatilize and remove at least part of the solvent from the ink.

18 Claims, 8 Drawing Sheets

(51) Int. Cl.
*B41J 3/28* (2006.01)
*C09D 11/30* (2014.01)
*C09K 3/00* (2006.01)
*B41J 3/407* (2006.01)
*B41J 3/60* (2006.01)
*B41J 2/195* (2006.01)
*B41M 7/00* (2006.01)
*C09D 11/322* (2014.01)
*C09D 11/326* (2014.01)
*C09D 11/328* (2014.01)
*C09D 11/40* (2014.01)

(52) U.S. Cl.
CPC ............... *B41J 3/60* (2013.01); *B41J 11/46* (2013.01); *B41M 7/009* (2013.01); *C09D 11/30* (2013.01); *C09D 11/322* (2013.01); *C09D 11/326* (2013.01); *C09D 11/328* (2013.01); *C09D 11/40* (2013.01); *C09K 3/00* (2013.01)

(58) Field of Classification Search
CPC .... B41J 11/002; B41M 5/0023; B41M 7/009; C09D 11/30; C09D 11/40; C09D 11/324; C09D 11/326
See application file for complete search history.

(56) References Cited

FOREIGN PATENT DOCUMENTS

| | | |
|---|---|---|
| JP | 2006342454 | 12/2006 |
| JP | 2007245374 | 9/2007 |
| JP | 2014227638 | 12/2014 |
| JP | 2015168114 | 9/2015 |

\* cited by examiner

Calculation of thermal time constant in vinyl chloride

■ Vinyl chloride - value of physical properties

| Physical properties | Value | Unit | Value used in calculation |
|---|---|---|---|
| Density | $1.36 \times 10^3 \sim 1.54 \times 10^3$ | [kg/m³] | $1.45 \times 10^3$ |
| Specific heat | $1.05 \times 10^3 \sim 1.22 \times 10^3$ | [J·kg⁻¹·K⁻¹] | $1.14 \times 10^3$ |
| Thermal conductivity | $0.15 \sim 0.21$ | [J·s⁻¹·m⁻¹·K⁻¹] | 0.18 |

$$\tau = mc\frac{1}{\lambda}$$

$$= \rho c \frac{1}{\lambda}$$

$$= 1.45 \times 10^3 \times 10^{-3} \times 1.14 \times 10^3 \times \frac{10^{-3}}{0.18}$$

$$\approx 9.18 \, [s]$$

$\tau$: thermal time constant $[s]$
$\lambda$: thermal conductivity $[J \cdot s^{-1} \cdot m^{-1} \cdot K^{-1}]$
$\rho$: density $[kg/m^3]$
$c$: specific heat $[J \cdot kg^{-1} \cdot K^{-1}]$
$m$: mass $[kg]$

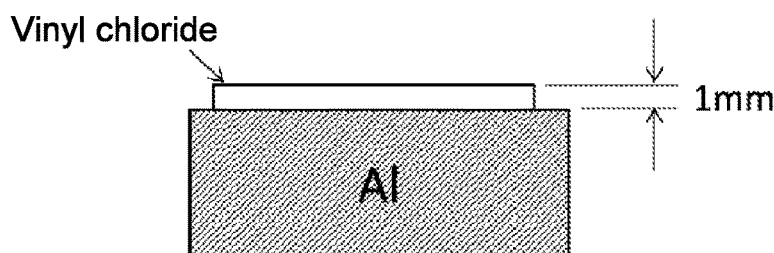

FIG. 4

PRINTING APPARATUS AND PRINTING METHOD

CROSS-REFERENCE TO RELATED APPLICATION

This application is a 371 application of the international PCT application serial no. PCT/JP2017/004025, filed on Feb. 3, 2017, which claims the priority benefits of Japan application no. 2016-020063, filed on Feb. 4, 2016 and international PCT application no. PCT/JP2016/087981, filed on Dec. 20, 2016. The entirety of each of the abovementioned patent applications is hereby incorporated by reference herein and made a part of this specification.

TECHNICAL FIELD

This invention relates to a printing apparatus and a printing method.

BACKGROUND ART

Conventionally, inkjet printers that perform inkjet printing are used for various purposes (for example, non-patent literature 1). Inks conventionally used for diverse purposes in the inkjet printers may be evaporation drying inks including aqueous inks such as aqueous pigment inks, latex inks, and inks in which pigment-encapsulated resin particles are dispersed, and organic solvent-containing solvent inks. Among the mentioned inks, the evaporation drying ink refers to ink dried by evaporating a solvent included in the ink to be fixed to a print medium.

In the inkjet printer using an aqueous evaporation drying ink, the ink is heated by a heater and dried to be prevented from bleeding and fixed to a print medium. In a specific example, the medium is heated by a heater (printing heater) so as to prevent ink from bleeding, and the ink is then further heated to be dried and fixed by another heater (after-heating means), for example, an infrared lamp. A known means employed to prevent ink bleeding is to form an ink receiving layer on a target print medium.

CITATION LIST

Patent Literature

Non-patent Literature: URL http://www.mimaki.co.jp

SUMMARY

Technical Problems

Employing the formation of an ink receiving layer on a medium as a bleeding-preventable means suggests that the only acceptable print mediums are those having such an ink receiving layer previously formed thereon. This bleeding-preventable means may involve a possible risk of a solvent included in the ink being left in the ink receiving layer, possibly leading to other issues. For example, when a medium is used that needs to be rolled up after the printing, the ink may be likely to bleed through to the back surface of the medium being collected by a take-up device. In case a base layer formed below the ink receiving layer is made of, for example paper, abundant ink consumption, as in color printing, may increase the likelihood of curling or cockling of a medium used.

When a fabric medium is used, for example, it is necessary to prepare a fabric material coated with, as the ink receiving layer, a pretreatment agent (sizing agent or auxiliary agent for color development) serving to prevent ink bleeding or assist color development. Such pretreatment should be handled by a professional specialist, resulting in time loss and cost increase.

In an attempt to increase a printing speed while heating a medium using a printing heater to prevent ink bleeding, the medium should desirably be heated at high temperatures at a position on a platen facing an inkjet head. At higher heating temperatures, however, the nozzle surface of the inkjet head may be undesirably heated, which increases the risk of nozzles being clogged with ink.

For example, ink containing a low-boiling solvent may be easier to evaporate and less likely to bleed. Such ink, however, may evaporate sooner in nozzles, often clogging the nozzles. Thus, the evaporation drying inks may be conventionally difficult to use because of a higher risk of ink bleeding.

The likelihood of ink bleeding in using such evaporation drying inks may noticeably increase with higher printing speeds, color printing at higher concentrations, and duplex printing, because of an increased amount of ink landing on the medium per unit area and per unit time (amount of ejected ink). In this instance, paper mediums, if used, may be more likely to undergo such problems as curling or cockling.

Other than the evaporation drying inks, ultraviolet-curable inks (UV inks), which are curable under ultraviolet radiation, are also widely used in the inkjet printers. The ultraviolet-curable ink may be instantaneously cured and prevented from bleeding on a medium by being irradiated with ultraviolet light immediately after droplets of the ink landed on the medium. It is unnecessary to heat the medium when such inks are used, which may reduce the risk of the ink clogging nozzles. The ultraviolet-curable ink, however, may be cured before dots of the ink are sufficiently flattened. Then, the surface of the ink may often become uneven and matte, and/or even too thick. Therefore, thin, flat images, which may be demanded in certain fields of application of printed matters, may not be possible, failing to obtain a desired printing quality. In view of these possible problems, the evaporation drying inks may be inevitably used in some fields of application, instead of ultraviolet-curable inks.

In order to deal with such issues of the ultraviolet-curable inks, matte surface and large ink thickness, and obtain less uneven, glossy printed matters, solvent UV inks (SUV inks) which are solvent-diluted, ultraviolet-curable inks, may be selected and used. When the solvent UV ink is used, however, the solvent needs to be volatilized away from the ink immediately after droplets of the ink landed on a medium. This may raise the same issues that are associated with the evaporation drying inks.

To address the issues of the known art, an effective method is desirably developed that can adequately suppress the risk of ink bleeding when the evaporation drying inks are used. To this end, this invention provides a printing apparatus and a printing method that may address the issues and fulfill the needs.

Solutions to the Problems

The inventors of this invention conducted various studies in the search of a method for successfully suppressing the risk of ink bleeding when the evaporation drying inks are used. The inventors came up with the idea of adding an ultraviolet absorbent to the evaporation drying ink and heating the resulting ink under ultraviolet radiation, instead of such a simple heating method using a heater immediately after landing. This method may allow the ink to be efficiently dried and thereby allow the solvent in the ink to be sufficiently evaporated. This method, while preventing the occurrence of nozzle clogging under heat, may more adequately suppress the risk of ink bleeding.

This invention provides a printing apparatus that carries out a printing operation for a medium by an inkjet scheme. The printing apparatus includes: an inkjet head that ejects a droplet of an ink by the inkjet scheme; and an ultraviolet light source that radiates an ultraviolet light. The ink contains an ultraviolet absorbent that absorbs the ultraviolet light, and a solvent that dissolves or disperses the ultraviolet absorbent. The ejected ink is adherable to the medium and fixable by evaporating the solvent, and the ultraviolet light source irradiates the ink adhered to the medium with the ultraviolet light so as to volatilize and remove at least part of the solvent from the ink.

According to the configuration, the ultraviolet absorbent-containing ink may be efficiently heated by ultraviolet radiation. The ink may be efficiently heated immediately after droplets of the ink landed on the medium so as to volatilize and remove the solvent from the ink, substantially without affecting the nozzle surface of the inkjet head.

In the printing apparatus thus configured, the ultraviolet light source may volatilize and remove at least part of the solvent so as to thicken the ink on the medium until a degree of viscosity is reached at which the ink may be at least prevented from bleeding on the medium. Preventing the ink from bleeding may include substantially preventing the ink from bleeding within an allowable range that meets a demanded printing accuracy.

The ultraviolet light source may volatilize and remove the solvent from the ink so as to fix the ink to the medium without causing the ink to bleed. According to this configuration, the evaporation drying inks, for example, may be suitably fixed to the medium. The ink may be fixed to the medium by further heating the medium using another heating means subsequent to ultraviolet radiation.

The ultraviolet absorbent may be a material that generates heat through absorption of ultraviolet light. The ultraviolet absorbent may be a material having a peak wavelength for light absorption in the ultraviolet range. The ultraviolet absorbent may be a colorless material or a faint-colored material less likely to affect the ink color.

In this instance, the ultraviolet light source may be selected from semiconductor light sources including ultraviolet LED (UVLED) and ultraviolet LD (laser diode). The ultraviolet light source may heat the ink at once in a short time by irradiating the ink with ultraviolet light so that continuous irradiation time for the same position on the medium is smaller than the thermal time constant of heat dissipation from the medium. The ultraviolet light may be radiated toward the ink beyond a region on the medium facing the inkjet head. The ultraviolet light source may be used in combination with another heating device to heat the ink not to bleed. In this configuration, the content of the ultraviolet absorbent may be greater than or equal to 0.01 wt. % and less than or equal to 10 wt. % to the total weight of components of the ink. The content of the ultraviolet absorbent may be 0.05 to 3 wt. %, or desirably 0.05 to 2 wt. %, 0.05 to 1 wt. %, or 0.1 to 0.4 wt. %.

In this configuration, the printing apparatus may perform multi-pass printing. The number of print passes in this instance may be less than or equal to eight. For higher printing speeds, the number of print passes may be less than eight (for example, less than or equal to four). When the multi-pass printing is employed, higher printing speeds may be feasible with an appropriate decrease of the print passes. While the amount of ink landing on the medium per unit area and per unit time may increase with a smaller number of print passes, the ink may be prevented from bleeding by having the solvent volatilized away from the ink under ultraviolet radiation.

The scope of this invention may include a printing method having technical features equivalent to those of the printing apparatus described so far. Such a printing method may provide similar effects.

Effect of the Invention

This invention may adequately prevent the risk of ink bleeding, allowing a print result with a higher quality to be obtained.

BRIEF DESCRIPTION OF THE DRAWINGS

FIGS. 1(a) and 1(b) are an upper view and a cross-sectional view of the printing apparatus 10, illustrating its main structural elements by way of an example.

FIG. 2(a) is an exemplified operation to eject ink droplets to a medium 50. FIG. 2(b) is a cross-sectional view of an example of the medium 50 after the printing operation is over.

FIG. 3(a) is an exemplified operation to eject ink droplets to the medium 50. FIG. 3(b) is a cross-sectional view of an example of the medium 50 after the printing operation is over. FIG. 3(c) is a cross-sectional view of an example of the medium 50, which is a non-permeable medium, after the printing operation is over.

FIG. 4 is a further detailed drawing of a thermal time constant t in the medium 50.

FIG. 5(a) is a drawing that illustrates structural features of the printing apparatus 10. FIG. 5(b) is a drawing of a head unit in the printing apparatus 10.

FIG. 7(a) is a drawing of an exemplified printing operation for one of surfaces (front surface) of the medium 50. FIG. 7(b) is a drawing of an exemplified printing operation for the other surface (back surface) of the medium 50. FIG. 7(c) is another modified example of the printing operation for the medium 50.

FIG. 8(a) is a drawing that illustrates ultraviolet energy radiated toward ink. FIGS. 8(b) and 8(c) are drawings that illustrate a relationship between the content of an ultraviolet absorbent and the rate of absorption of ultraviolet light.

DESCRIPTION OF EMBODIMENT

Hereinafter, embodiments of this invention are described in detail with reference to the accompanying drawings.

Figure 1A:
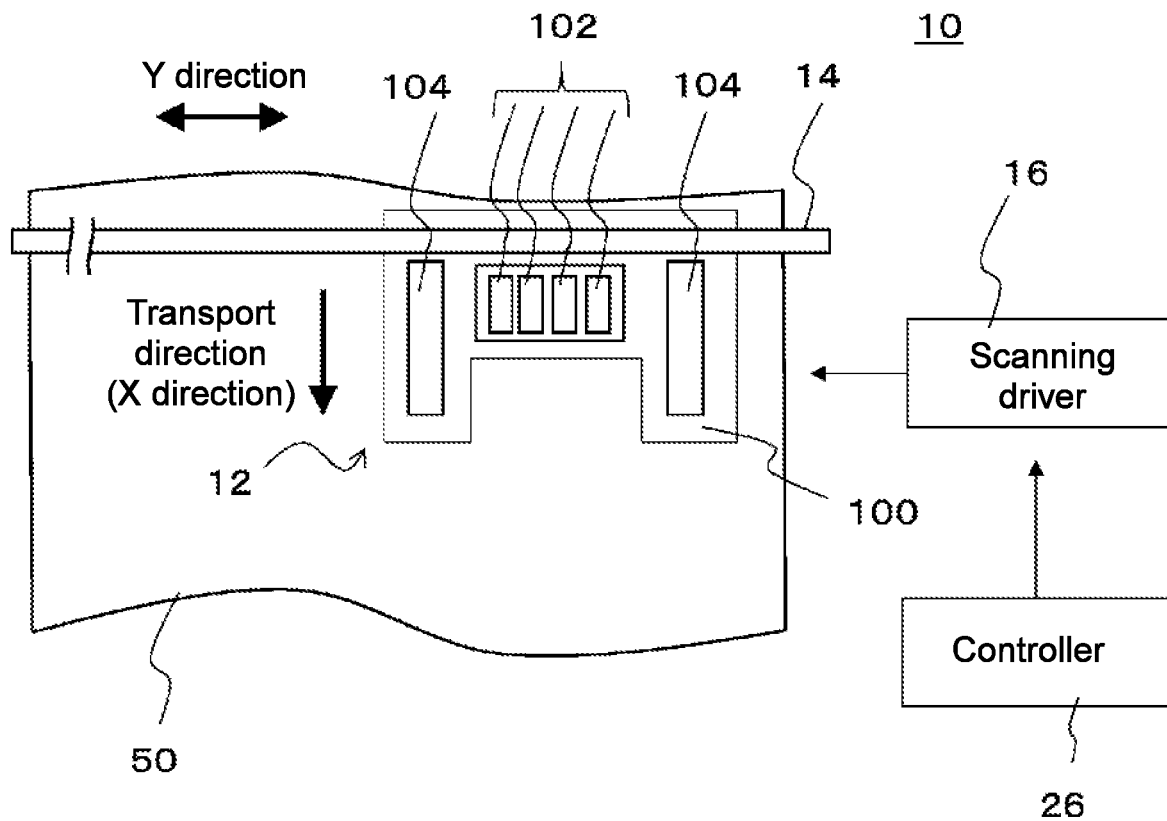
FIGS. 1(a) and 1(b) are drawings of a printing apparatus 10 according to an embodiment of this invention.
Figure 1B:
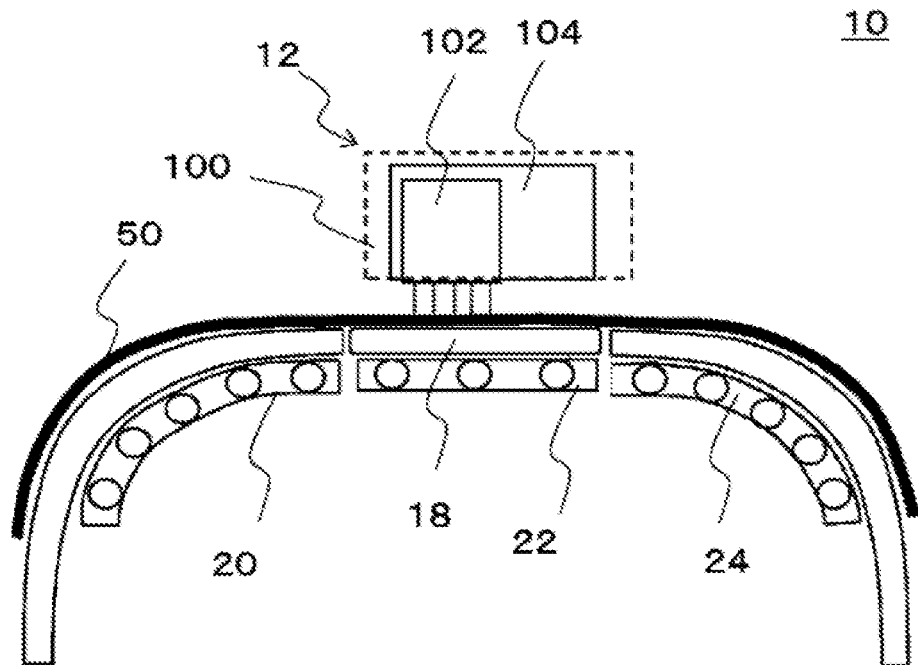

FIGS. 1(a) and 1(b) are drawings of a printing apparatus 10 according to an embodiment of this invention. FIGS. 1(a) and 1(b) are an upper view and a cross-sectional view of the printing apparatus 10, illustrating its main structural elements by way of an example. In this embodiment, the printing apparatus 10 is an inkjet printer that performs inkjet printing for a target print medium 50. The printing apparatus 10 includes a head unit 12, a guide rail 14, a scan driver 16, a platen 18, a pre-heating means 20, a printing heater 22, an after-heating means 24, and a controller 26.

Except for aspects hereinafter described, the printing apparatus 10 may be configured identically or similarly to the known inkjet printers. In addition to the aspects described below, the printing apparatus 10 may further include any necessary known means to effectuate its printing operation.

The head unit 12 (IJ head unit) ejects ink droplets to the medium 50, and includes a carriage 100, a plurality of inkjet heads 102, and a plurality of ultraviolet light sources 104. The carriage 100 is a member for holding the other structural elements of the head unit 12 (head carriage).

The inkjet heads 102 are heads configured for inkjet ejection of ink droplets. In this embodiment, the inkjet heads 102 respectively eject ink droplets having different colors, and the ejected different color inks are adhered to the medium 50. The inkjet heads 102 eject droplets of inks each containing at least an ultraviolet absorbent (UV absorbent) and a solvent (ultraviolet-absorbable ink). The ultraviolet absorbent may be a material that absorbs ultraviolet light and generates heat through ultraviolet absorption. The inks used in this embodiment are, therefore, heated by ultraviolet radiation. The solvent is a liquid added to the ink to dissolve or disperse the ultraviolet absorbent. These inks may further contain any suitable materials similar or identical to materials of the known inks. In this embodiment, the different color inks used in the inkjet heads 102 may further contain colorants of their colors (for example, pigments or dyes).

Specifically, the inkjet heads 102 eject droplets of process color inks for color printing. The process colors may be yellow (Y), magenta (M), cyan (C), and black (K). The inkjet heads 102 are arranged in a predetermined main scanning direction (Y direction in the drawing). The inkjet heads 102 perform main scans in which they eject the ink droplets while moving in the main scanning direction so as to adhere the inks to the medium 50. In this embodiment, the inkjet heads 102 bidirectionally perform main scans, specifically, in one direction and the other direction included in the main scanning direction.

The inks used in this embodiment are each an evaporation drying ink fixable to the medium 50 by having a solvent volatilized away from the ink. In an example of the evaporation drying ink, the solvent may be an organic solvent. The organic solvent may be a hydrophobic organic solvent. The hydrophobic organic solvent may be an organic solvent incompatible with water. In this instance, the solvent may be added to the ink to dissolve the ultraviolet absorbent. The organic solvent may be a volatile organic solvent. The organic solvent used may have a boiling point lower than or equal to 200° C. In other examples of the organic solvent, the boiling point may be lower than that of water, for example, lower than or equal to 80° C. A specific example of such ink may be a solvent ink containing an ultraviolet absorbent. The solvent ink may be ink containing a hydrophobic organic solvent.

For example, ink containing an aqueous solvent may also be usable. Specific examples of such ink may be aqueous inks each containing an ultraviolet absorbent. Examples of the aqueous ink may include aqueous pigment inks and aqueous dye inks. Suitable examples of the aqueous ink may include aqueous inks (resin particle-dispersed aqueous inkjet inks) in which resin particles are dispersed, such as latex inks, and inks in which pigment-encapsulated resin particles are dispersed. An example of the ultraviolet absorbent may be a material difficult to dissolve in aqueous solvents. In this instance, the solvent may be added to the ink to disperse the ultraviolet absorbent in solid state. The ink may accordingly become an emulsion (dispersion) ink in which at least part of the components is dispersed in the solvent.

The ultraviolet absorbent may be a material having a peak wavelength for light absorption in the ultraviolet range. The ultraviolet absorbent may be a colorless material or a faint-colored material less likely to affect the ink color. Further, absorptivity of the ultraviolet absorbent at the peak wavelength may be twice or more of the maximum absorptivity in the visible light range. The absorptivity at the peak wavelength may desirably be five times or more, or more desirably 10 times or more or 20 times or more of the maximum absorptivity in the visible light range.

In this embodiment, the content of the ultraviolet absorbent may be greater than or equal to 0.01 wt. % and less than or equal to 10 wt. % to the total ink weight (total weight of components of the ink). The content of the ultraviolet absorbent may desirably be 0.05 to 3 wt. %, 0.05 to 2 wt. %, 0.05 to 1 wt. %, or 0.1 to 0.4 wt. % to the total ink weight. The ink having such a composition may be allowed to sufficiently absorb ultraviolet light. Adding the ultraviolet absorbent in excess of the foregoing ranges is desirably avoided, so that absorption of light in the visible light range is suitably controlled. Further, the ink may be appropriately heated by ultraviolet radiation, substantially without such unfavorable events as cloudiness and poor color brightness of the color inks resulting from absorption of excess light in the visible light range. For color inks having very bright colors, the ultraviolet absorbent may desirably be very transparent and less likely to absorb light in the visible light range.

When different color inks are used, as described in this embodiment, a desirable content of the ultraviolet absorbent may possibly differ from one color to another of such inks. Therefore, the content of the ultraviolet absorbent may be adjusted differently for the respective colors. In this instance, the content of the ultraviolet absorbent in each of color inks may be adjusted to an extent that differences in sensitivity to ultraviolet light among different color inks stay within approximately ±50%. The sensitivity of ink to ultraviolet light may be sensitivity in terms of drying rate and/or rate of temperature rise of ink irradiated with ultraviolet light. The features of inks used in this embodiment will be described later in further detail.

The ultraviolet light sources 104 emit ultraviolet light (instantaneous heating UV irradiator). The ink adhered to the medium 50 is irradiated with ultraviolet light emitted from these light sources and thereby heated. The ultraviolet light sources 104 may accordingly volatilize and remove at least part of the solvent included in the ink.

In this embodiment, the ultraviolet light sources 104, in combination with another heater such as the printing heater 22, heats the ink so as to volatilize the solvent away from the ink. A respective one of the ultraviolet light sources 104 is disposed on one side and on the other side of a group of inkjet heads 102 in the main scanning direction and move with the inkjet heads 102 during main scans. During main scans, one of the ultraviolet light sources 104 is behind the inkjet heads 102 in a direction of movement of the inkjet heads 102, while the other one is ahead of the inkjet heads 102 in the direction of movement. In each main scan bidirectionally performed, ink on the medium 50 is irradiated with ultraviolet light emitted from the ultraviolet light source 104 behind the inkjet heads 102 in a current direction of movement of the inkjet heads 102. The ultraviolet light sources 104 may accordingly radiate ultraviolet light toward a region that the inkjet heads 102 passed, so that ink that just landed on the medium 50 is irradiated with ultraviolet light. Then, the ink is increased in viscosity before starting to bleed on the medium 50. Thus, the risk of ink bleeding may be suppressed.

The ultraviolet light sources 104 may be selected from ON-OFF controllable light sources configured to radiate ultraviolet light. Such a light source may be an ultraviolet semiconductor light source, for example, ultraviolet LED (UVLED emitter) or ultraviolet LD (laser diode). As a result, ultraviolet light may be accurately and precisely radiated at any time desired. In this embodiment, the ultraviolet light sources 104 are each a UVLED-equipped light source (UV-LED irradiator). In this instance, the ultraviolet light source 104 may be a condensing ultraviolet LED irradiator that condenses light. The ultraviolet light source 104 may be regarded as an instantaneous UV heater that rapidly heats and dries ink that landed on the medium 50 in a predetermined period of time.

In this embodiment, the ultraviolet light sources 104 are displaced relative to the inkjet heads 102 and accordingly radiate ultraviolet light toward ink on the outside of a region of the medium 50 facing the inkjet heads 102. Specifically, the ultraviolet light sources 104 are displaced relative to the inkjet heads 102 in the main scanning direction so as to radiate ultraviolet light toward ink on the outside of a region of the medium 50 facing the inkjet heads 102. This may suitably prevent that the evaporated solvent and ultraviolet-heated ink adversely affect the inkjet heads 102. A duration of time before ultraviolet radiation starts after the ink landed on the medium 50 may be appropriately adjusted by changing a distance between the inkjet heads 102 and the ultraviolet light sources 104. The duration of ultraviolet radiation from the ultraviolet light sources 104 (continuous irradiation time) may be appropriately adjusted by adjusting the width of the ultraviolet light source 104 in the main scanning direction.

The width of the ultraviolet light source 104 in a sub scanning direction (X direction in the drawing) orthogonal to the main scanning direction may be equal to or greater than a printing width of the inkjet heads 102. The printing width of the inkjet heads 102 may be the width of a region in the sub scanning direction to which the ink droplets are ejected from the inkjet heads 102 in one main scan. In this embodiment, the sub scanning direction is parallel to a direction in which the medium 50 is transported (paper feed direction).

In this embodiment, the width of the ultraviolet light source 104 is greater than the printing width in the sub scanning direction, and may accordingly radiate ultraviolet light toward any part of the medium but a part in front of the inkjet heads 102 in the sub scanning direction as illustrated in FIG. 1(*a*). The ultraviolet light sources 104 are thus allowed to radiate ultraviolet light in the transport direction of the medium 50 toward, as well as a region in front of the inkjet heads 102, a region more downstream than the inkjet heads 102. Then, timing of ending heating using the ultraviolet light sources 104 may be appropriately adjusted. The ultraviolet radiation allowed for the more downstream region than the inkjet heads 102 may reduce time to fully dry ink through evaporation after the heating started.

In this embodiment, the ultraviolet light sources 104 may volatilize and remove at least part of the solvent so as to thicken ink on the medium 50 until a degree of viscosity is reached at which the ink may be at least prevented from bleeding on the medium 50. The ink bleeding described herein may be specifically inter-color bleeding that occur when inks having different colors are mixed into each other. The bleeding-preventable degree of viscosity may be specifically a degree of viscosity at which the occurrence of ink bleeding is preventable until the ink is fully dried and fixed to the medium 50. The occurrence of ink bleeding being preventable may include the occurrence of ink bleeding being substantially preventable within an allowable range that meets a demanded printing accuracy. The ultraviolet light sources 104 may increase the viscosity of ink on the medium 50 under ultraviolet radiation to, for example, greater than or equal to 50 mPa·s or desirably greater than or equal to 100 mPa·s or greater than or equal to 200 mPa·s.

The directivity of ultraviolet light emitted from the ultraviolet light sources 104 may be set such that ultraviolet light does not arrive at nozzle surfaces of the inkjet heads 102. This may suitably prevent that heating using the ultraviolet light sources 104 has any adverse impact on the inkjet heads 102. The mechanism of ink being irradiated with ultraviolet light from the ultraviolet light sources 104 will be described later in further detail.

The guide rail 14 is a member including a rail. The guide rail 14 extends in the main scanning direction and guides movement of the carriage 100 in the main scanning direction. The scan driver 16 prompts the inkjet heads 102 to perform main scans and sub scans.

In this embodiment, the scan driver 16 moves the carriage 100 along the guide rail 14 so as to move the inkjet heads 102 held in the carriage 100 in the main scanning direction. Then, the scan driver 16 prompts the inkjet heads 102 to perform main scans in which the inkjet heads 102 being moved eject the ink droplets based on printing data indicating an image to be printed (for example, color image).

In sub scans performed by the inkjet heads 102, the inkjet heads 102 may be moved in the sub scanning direction relative to the medium 50. In this embodiment, the scan driver 16 transports the medium 50 in the transport direction parallel to the sub scanning direction to prompt the inkjet heads 102 to perform sub scans. The scan driver 16 transports the medium 50 at an interval between the main scans so as to change a region of the medium 50 that faces the inkjet heads 102 in a next one of the main scans. In this manner, the scan driver 16 prompts the inkjet heads 102 to eject the ink droplets to different positions on the medium 50. In this embodiment, the scan driver 16 further moves the ultraviolet light sources 104 with the inkjet heads 102 during main scans and prompts the ultraviolet light sources 104 to radiate ultraviolet light at positions of the ink droplets ejected from the inkjet heads 102.

The platen 18 is a table-like member disposed at a position opposite to the head unit 12. The medium 50 is mounted on and supported by the upper surface of the platen 18 so as to face the head unit 12. In this embodiment, the platen 18 has, in its inner space, the pre-heating means 20, printing heater 22, and after-heating means 24 that are provided to heat the medium 50.

The pre-heating means 20, printing heater 22, and after-heating means 24 are used to heat the medium 50 and consequently heats ink on the medium 50 through the medium 50 so as to volatilize and remove the solvent in the ink and dry the ink. By using such additional heating means in combination with the ultraviolet light source 104, the solvent may be more effectively volatilized away from the ink. This may further accelerate drying of the ink, allowing the ink to be more reliably fixed to the medium 50.

The pre-heating means 20 is used for preliminary heating of the medium 50. The printing heater 20 is disposed more upstream than the inkjet heads 102 in the transport direction of the medium 50 so as to preliminarily heat a region of the medium 50 where the ink droplets will be ejected. The printing heater 22 heats the medium 50 at a position opposite to the inkjet heads 102. The ultraviolet light sources 104 irradiate ink on the medium 50 heated by the printing heater 22 with ultraviolet light so as to volatilize and remove at least part of the solvent included in the ink in collaboration with the printing heater 22. In this manner, the solvent may be sufficiently volatilized away from the ink that just landed on the medium 50, and the ink may be sufficiently thickened before starting to bleed on the medium 50.

The after-heating means 24 is disposed more downstream than the inkjet heads 102 in the transport direction. The after-heating means 24 further heats the medium 50 that passed the printing heater 22 and the ultraviolet light sources 104 so as to remove any residue of the solvent that failed to be removed by the ultraviolet light sources 104 and the printing heater 22. Thus, the ink may be more certainly dried and fixed to the medium 50 by the after-heating means 24.

FIGS. 1(a) and 1(b) illustrate, as an example of the after-heating means 24, a thermal conductivity heater that heats the medium 50 through thermal conduction transmitted through the platen 18. Any other suitable heating means but the thermal conductivity heater may be used as the after-heating means 24 in case the medium 50 has poor thermal conductivity. The after-heating means 24 may be a dryer such as hot-air heater and infrared heater, or any suitable one selected from these examples may be used in combination with the after-heating means 24 of thermal conductivity type.

The controller 26 may be the CPU of the printing apparatus 10 that controls the structural elements of the printing apparatus 10. In this embodiment, desired print results may be obtained with the medium 50.

In this embodiment, the ultraviolet absorbent-containing ink may be efficiently heated by ultraviolet radiation immediately after droplets of the ink landed on the medium. Such heating efficiency may allow for lower heating temperatures of the printing heater 22 of this embodiment that heats the medium 50 at a position opposite to the inkjet heads 102. According to this embodiment, the solvent may be adequately volatilized and removed from the ink substantially without any impact on nozzle surfaces of the inkjet heads 102, and the ink may be sufficiently increased in viscosity before starting to bleed.

The ink dried under ultraviolet radiation may be suitably fixed to the medium 50. In this embodiment, the medium 50 is heated by the pre-heating means 20, printing heater 22, and after-heating means 24. The ink may be accordingly more effectively dried than being heated by the ultraviolet light sources 104 alone. Thus, this embodiment may adequately suppress the risk of ink bleeding when evaporation drying inks are used. Therefore, high-quality print results may be obtained.

The printing apparatus 10 according to this embodiment may include use of a plurality of heating means as a means for drying (fixing) evaporation drying inks. For example, the printing heater 22 may be a first heating means that heats the medium 50 from the back-surface side at a position at which the ink droplets are ejected from the inkjet heads 102 (printing position), and the ultraviolet light sources 104 may be a second heating means used in combination with the first heating means. The heating temperature of the first heating means may be 70° C. or below, or desirably 60° C. or below. The second heating means irradiate the ink droplets on the medium 50 at different positions with ultraviolet light in the order that the ink droplets ejected from the inkjet heads are landing on the medium 50. The ultraviolet light sources 104, second heating means, may be ON-OFF controllable devices.

The printing apparatus 10 according to a modified example may be equipped with the second heating means alone, instead of the first and second heating means both. In this instance, ink may be heated by the ultraviolet light sources 104 alone without the printing heater 22. In another modified example of the printing apparatus 10, an additional heating means may be used in combination with the ultraviolet light sources 104 and the printing heater 22. For example, the printing apparatus 10 may be further equipped with an infrared light source disposed at a position opposite to the after-heating means 24 and more downstream than the ultraviolet light sources 104 in the transport direction. Then, combined use of the infrared light source and the after-heating means 24 may allow ink on the medium 50 to be heated well and fully dried. In case such an infrared light source is further used, the after-heating means 24 may be unnecessary.

In this embodiment, ultraviolet light having a lower impact on ink color is used to heat the ink. Another possible means for light with less impact on ink color may be an infrared light source that emits infrared light, which may be used to heat ink instead of the ultraviolet light sources 104. In this instance, when an infrared absorbent having transparency against light in the visible light range is added to the ink, the risk of ink bleeding may be suppressed likewise without any impact on coloration of a print result.

However, the infrared absorbents, with some exceptions, normally exhibit very high absorbency that cannot be disregarded for light in the visible light range. An attempt to minimize possible impact on coloration of a print result may naturally narrow down a range of materials usable as the infrared absorbent, possibly resulting in failure to use any ink with desired properties in a proper manner.

On the other hand, many of the known ultraviolet absorbents have substantially low absorbency for light in the visible light range. Therefore, an ultraviolet absorbent most suitable for properties of ink used may be easily and adequately selected from a diverse range of options. This embodiment, therefore, may facilitate the success of means that allows ink bleeding to be prevented.

When a plurality of color inks are used as described in this embodiment, use of infrared light may involve the risk of color-dependent variability among the color inks being heated. In case regular pigment inks are used, for example, ink containing a black (K) pigment of carbon black absorbs more infrared light than any other color inks. If the intensity of infrared light is increased so as to sufficiently dry the other color inks of Y, M, and C, the black ink may be burnt. If the intensity of infrared light is set suitably for the black ink, the respective color inks may be dried to different degrees. This, as well as the other factors, may strongly suggest desirability of ultraviolet light.

Figure 2A:
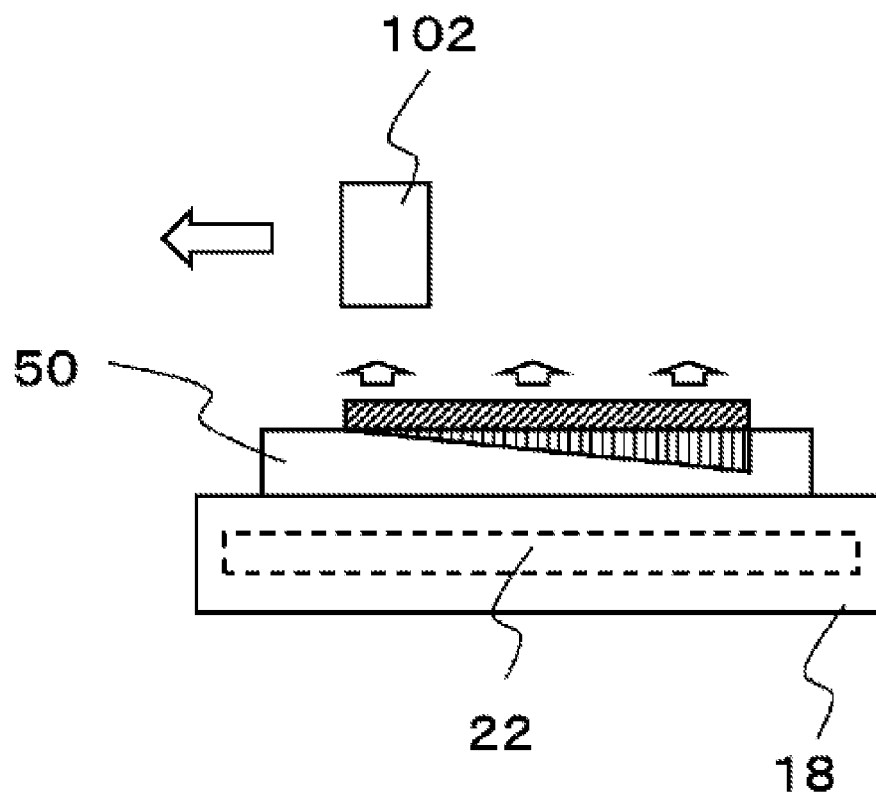
FIGS. 2(a) and 2(b) are schematic drawings of an exemplified printing operation of a conventional printing apparatus.
Figure 2B:
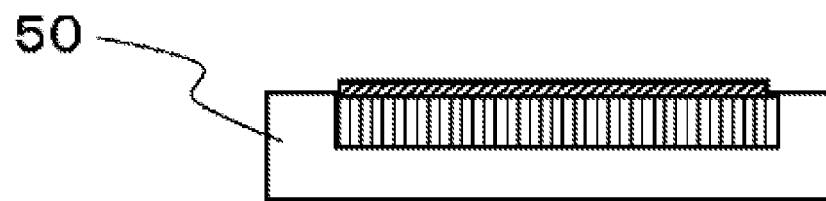

A printing operation for the medium 50 in this embodiment is hereinafter described in further detail. To better understand this embodiment, the description starts with an exemplified printing operation of a conventional printing apparatus. FIGS. 2(a) and 2(b) are drawings that illustrate in a simplified manner (modeled example) an exemplified printing operation of a conventional printing apparatus (drying process model). In this printing operation, ink containing no ultraviolet absorbent is used and dried by a heater in the platen 18 alone (printing heater 22) (printing operation in which no ultraviolet absorbent-containing ink is used).

The printing operation illustrated in FIGS. 2(a) and 2(b) may be carried out by a printing apparatus similar or identical to the printing apparatus 10 of FIGS. 1(a) and 1(b) but is equipped with no ultraviolet light source 104. The heating temperature of the printing heater 22 may be suitably adjusted in accordance with differences to the printing apparatus 10 of FIGS. 1(a) and 1(b).

FIG. 2(a) is an exemplified operation to eject ink droplets to a medium 50. FIG. 2(b) is a cross-sectional view of an example of the medium 50 after the printing operation is over. Referring to FIGS. 2(a) and 2(b), ink used in this printing operation may be similar or identical to the ink used in the printing apparatus 10 of FIGS. 1(a) and 1(b), except that the ink contains no ultraviolet absorbent. This ink may be a known evaporation drying ink. Specifically, a known aqueous ink is used in the printing operation of FIGS. 2(a) and 2(b). The medium 50 used in this printing operation has absorbency for ink before its solvent is volatilized and removed (permeable medium). Specific examples of such medium 50 may include paper and fabric.

In the printing operation of this conventional printing apparatus using the evaporation drying ink, the whole medium 50 is heated by, for example, the printing heater 22 so as to volatilize and remove the solvent from the ink and thereby suppress the risk of ink bleeding on the medium 50. As illustrated in FIG. 2(a), droplets of the ink are ejected from the inkjet heads 102 to the medium 50 being heated by the printing heater 22.

The whole region of the medium 50 to which the ink droplets have been adhered is heated by the printing heater 22 disposed at a position opposite to inkjet heads 102 in the platen 18 until a certain temperature is reached, for example, approximately 70° C. or below (for example, 50 to 70° C.) or 60° C. or below (for example, 50 to 60° C.). This heating increases the ink in viscosity by further heating an ink layer formed on the surface of the medium 50 so as to suppress the risk of ink bleeding.

When the medium 50 is heated by the printing heater 22, the inkjet heads 102 disposed opposite to the printing heater 22 across the medium 50 may be affected by heat radiation. If the heating temperature of the printing heater 22 is increased to higher temperatures than the before-mentioned ranges, heat radiation may have an even greater impact on the inkjet heads 102. As a result, ink in the vicinity of nozzles of the inkjet heads 102 may become dry, possibly clogging the nozzles. Therefore, higher heating temperatures than the before-mentioned ranges may be difficult to employ. At higher heating temperatures and resulting higher rates of solvent evaporation, the solvent evaporated may likely to agglutinate and adhere to the inkjet heads 102 whose temperature is relative low, undermining stability of ink ejection from these inkjet heads. This is another reason why the heating temperature of the printing heater 22 is desirably not increased.

On the other hand, lower heating temperatures than the before-mentioned ranges may require more drying time, possibly increasing the risk of ink bleeding. Another possible risk may be penetration of too much ink into the medium 50 before the ink is sufficiently dried. Therefore, lower heating temperatures than the before-mentioned ranges may also be difficult to employ. To dry the ink using the printing heater 22, the medium 50 may desirably be heated at a temperature in the before-mentioned ranges (medium temperatures). By heating the medium 50 using the printing heater 22 at such a medium temperature, the solvent may be volatilized away from the ink, substantially without any adverse impact from heat radiation.

Yet, higher printing speeds may conversely slow down the drying rate, possibly increasing the risk of ink bleeding. Higher printing speeds may necessitate a decreased number of print passes. In the conventional printing operation described earlier, approximately 8 to 32 print passes may be normally set. A smaller number of print passes may increase the amount of ink landing on the medium per unit area and per unit time, with not enough time to dry the ink in such a large amount. In case the medium 50 is a permeable medium, the capillarity may cause the ink to penetrate too deep into the medium 50 over time after landing on the medium, decreasing the amount of ink left on the surface of the medium 50 as indicated in a hatched pattern of the medium 50 in the drawings. This may lower the concentrations of printing inks, leading to a poorly colored print result. Such a poorly colored print result (printed matter) may often appear blurred. Higher printing speeds in the printing operation of the conventional printing apparatus may often lead to the risk of ink bleeding and a print result poorly colored when a pattern/image-printed surface is observed.

Higher temperatures of the printing heater 22 are deemed to be a solution to the problem of ink bleeding because the rate of solvent evaporation is correspondingly accelerated, which may effectively reduce the risk of ink bleeding. At higher heating temperatures of the printing heater 22, however heat radiation may have a greater impact on nozzle surfaces of the inkjet heads 102 at a position opposite to the printing heater 22, increasing the risk of nozzles being clogged with ink. In this regard, there is naturally an upper limit for the heating temperature of the printing heater 22 to ensure stability in the ejection of ink droplets. In the known printing apparatus in which the amount of ink landing on the medium per unit area and per unit time is unavoidably increased at higher printing speeds, there is certainly a ceiling to possible printing speeds.

In the conventional printing apparatuses, therefore, the heating temperature of the printing heater 22 may be often approximately between 50° C. and 60° C. or 40° C. and 60° C. As described earlier, higher printing speeds, with such heating temperatures being employed, may involve the risks of ink bleeding and penetration of too much ink into the medium 50. A print result (printed matter) thus obtained may often appear blurred. These problems may be more noticeable with even lower heating temperatures of the printing heater 22 (for example, approximately 40° C.).

At such low drying temperatures and at high printing speeds, the amount of ink landing on the medium per unit area and per unit time thus increases, and abundant ink may be likely to spread and start to bleed along the surface of the medium 50. When the number of print passes is decreased to, for example, eight passes or less (one to eight passes) to increase the printing speed, the amount of ink landing on the medium per unit area and per unit time increases, and it becomes more difficult to prevent the occurrence of ink bleeding with the printing heater 22 alone in a range of temperatures at which poor ink ejection may be avoidable. Thus, the known printing apparatuses were conventionally difficult to perform high-speed printing and suppress the risk of ink bleeding at the same time.

It may be an option to add a solvent having a low boiling point to ink in order to increase the rate of ink evaporation and reduce the risk of ink bleeding. However, ink containing such a solvent may be rapidly evaporated in the inkjet heads 102 and likely to clog the nozzles, leading to poor ink ejection as in the case of increasing the heating temperature of the printing heater 22. This option, therefore, fails to be a solution to these issues of the known art.

Figure 3A:
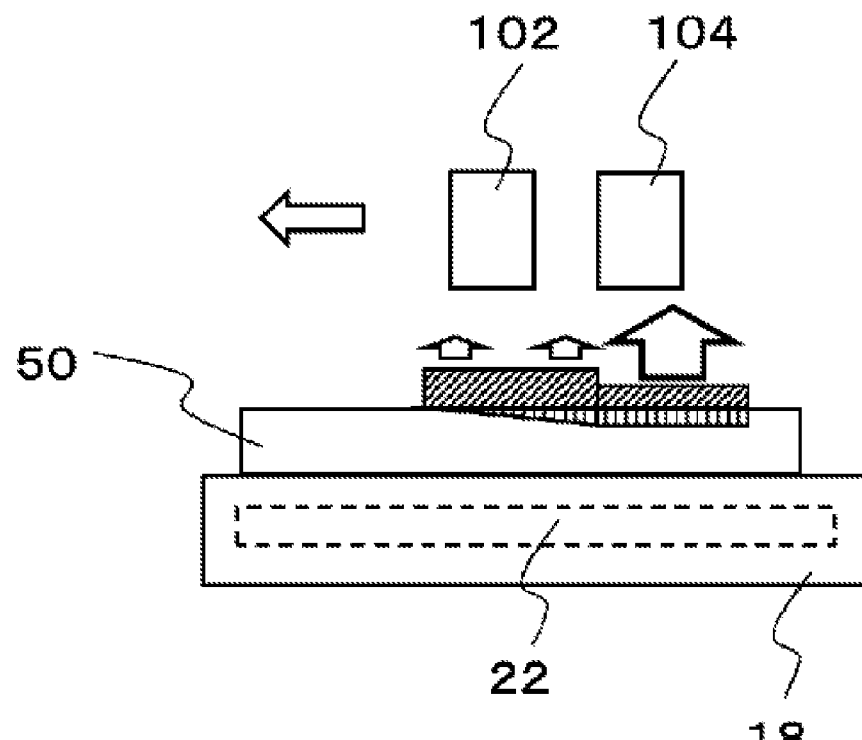
FIGS. 3(a) to 3(c) are schematic drawings of an exemplified printing operation of the printing apparatus 10.
Figure 3B:
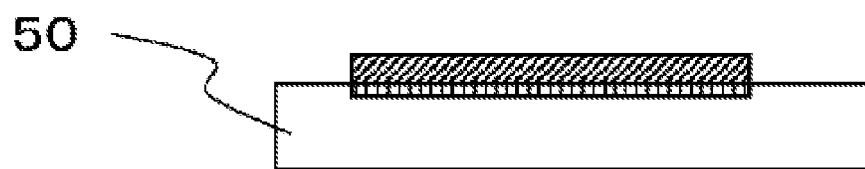
Figure 3C:
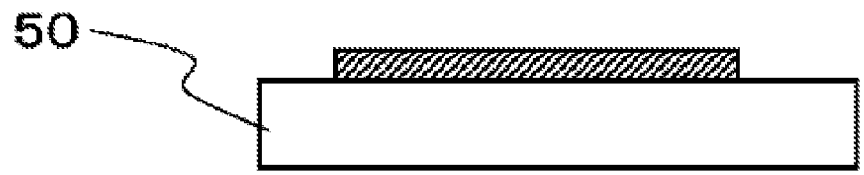

The printing apparatus 10 according to this embodiment described referring to FIGS. 1(a) and 1(b), on the other hand, may successfully address these issues by using ultraviolet absorbent-containing inks. FIGS. 3(a) to 3(c) are drawings that illustrate in a simplified manner (modeled example) an exemplified printing operation of the printing apparatus 10 of this embodiment (drying process model). FIG. 3(a) is an exemplified operation to eject ink droplets to the medium 50.

As described earlier, the printing apparatus 10 of this embodiment rapidly volatilizes the solvent away from the ink using the ultraviolet light sources 104 and the printing heater 22, and thereby dries the ink that just landed on the medium 50 so as to thicken the ink to a degree of viscosity at which the occurrence of ink bleeding may be preventable. As compared with ink being dried by the printing heater 22 alone, the heating temperature of the printing heater 22 may be set to lower temperatures. The heating temperature of the printing heater 22 may be specifically a temperature of the printing heater 22 set for a region facing the inkjet heads 102.

This may reduce heat radiation generated by the printing heater 22 heating the ink, reducing the risks of nozzles being clogged with ink and the ink being dried on nozzle surfaces of the inkjet heads 102. In this embodiment, the ultraviolet light sources 104 radiate ultraviolet light toward ink on the outside of a region of the medium 50 facing the inkjet heads 102, as illustrated in FIG. 3(a). Then, at a position on the medium 50 opposite to the inkjet heads 102, the solvent in the ink is heated by the printing heater 22 alone and thereby relatively slowly evaporated. This may prevent that the solvent evaporated may agglutinate and adhere to the inkjet heads 102, providing improved stability of ink ejection.

The ink ejected from the inkjet heads 102 that landed on the medium 50, before being irradiated with ultraviolet light emitted from the ultraviolet light sources 104, is preliminarily heated by the printing heater 22 at relatively low temperatures lower than or equal to 70° C. or lower than or equal to 60° C. (for example, at approximately 20 to 60° C.) in a region of the medium 50 facing the inkjet heads 102. The heating temperature of the printing heater 22 may be approximately 20 to 50° C., or desirably approximately 20 to 45° C. The heating temperature of the printing heater 22 may be substantially equal to heating temperatures of the known low-speed printers that are not equipped to perform high-speed printing.

In this embodiment, the ultraviolet light sources 104 radiate ultraviolet light toward the vicinity of a region facing the inkjet heads 102 and directly heats the ink in the region so as to rapidly evaporate the solvent of the ink and thicken the ink to a higher degree of viscosity. Thus, the ink may be sufficiently increased in viscosity to adequately prevent ink bleeding before starting to bleed. The ink may be increased in viscosity before much of the ink is absorbed into the medium 50, and an ink layer to be formed on the surface of the medium 50 does not undesirably become thinner. By radiating ultraviolet light with a region facing the inkjet heads 102 being avoided, the inkjet heads 102 may be unlikely to be affected by the solvent evaporation and/or heat radiation generated by ultraviolet light from the ultraviolet light sources 104. In this embodiment, therefore, the ink that landed on the medium may be rapidly increased in viscosity without undermining stability of ink ejection.

Referring to FIGS. 1(a), 1(b) and 3(a) to 3(c), the ultraviolet light sources 104 move with the inkjet heads 102 in the main scanning direction during main scans. The ultraviolet light source 104 behind the inkjet heads 102 in the moving direction of these inkjet heads irradiates the ink on the medium 50 with ultraviolet light. In this manner, ultraviolet radiation from the ultraviolet light source 104 starts immediately after the inkjet heads 102 passed a respective one of positions on the medium 50, so that ultraviolet light is selectively absorbed by the ink that already landed on the medium alone. Thus, instead of the whole medium 50 being heated to high temperatures, an ink layer formed on the medium 50 alone may be selectively and rapidly heated. The solvent is volatilized away from the ink thus heated so as to increase the ink in viscosity, and the occurrence of ink bleeding may be accordingly prevented.

As described earlier, the ultraviolet light source 104 radiate ultraviolet light toward a region on the medium 50 after the inkjet heads 102 passed the region. This may prevent such unfavorable events that the inkjet heads 102 are affected by heat radiation during heating using the ultraviolet light sources 104, and that the solvent evaporated under ultraviolet radiation agglutinate and adhere to nozzle surfaces of the inkjet heads 102. This is another advantage of this embodiment that may ensure stability of ink ejection.

This embodiment uses evaporation drying inks, as described earlier. Such ink may be reliably fixed to the medium 50 by volatilizing the solvent away from the ink using the printing heater 22 and the ultraviolet light sources 104. In FIGS. 1(a), 1(b) and 3(a) to 3(c), the ink is further heated by the after-heating means 24 disposed more downstream than the ultraviolet light sources 104 in the transport direction of the medium 50 so as to fully dry the ink. In this embodiment, therefore, the ink may be more reliably fixed to the medium 50.

FIG. 3(b) is a cross-sectional view of an example of the medium 50 after the printing operation is over. When the medium 50 is, for example, a permeable medium, this embodiment may increase the ink in viscosity before much of the ink is absorbed into the medium 50 and rapidly dry the ink in the vicinity of the surface of the medium 50. This embodiment, therefore, may allow only a small amount of ink to penetrate into the medium 50 (shallow penetration), leaving much of the ink in the vicinity of the surface of the medium 50. As a result, the ink on the medium surface may be sufficiently thick. A print result thereby obtained is not faintly colored but is rich in color and vivid as expected. This embodiment may enable appropriate printing for the medium 50, while suppressing the risk of ink bleeding. The ratio and duration of time of any residual solvent remaining on the medium 50, which is a permeable medium, may be decreased by using the ultraviolet light sources 104, and such events as cockling and curling of the medium 50 made of, for example, paper may be successfully prevented.

In this embodiment, the ink may be reliably cured in short time by volatilizing the solvent away from the ink under ultraviolet radiation. Therefore, the printing-completed medium 50 may be promptly shifted to other steps that follow. In case the printing speed is increased in the printing apparatus 10 configured to roll up the printing-completed medium 50, the ink may be prevented from bleeding through to the back-surface side of the rolled-up medium.

The inventors of this invention conducted tests, in which they were convinced that approximately 80% of the solvent is successfully removable from the ink by ultraviolet radiation using the ultraviolet light sources 104. In this embodiment, therefore, ultraviolet radiation alone may allow most of the solvent to be removed from the ink and fix the ink to the medium 50.

When a permeable medium is the print target medium, the ultraviolet light sources 104, if used as described in this embodiment, may still fail to prevent a trace amount of ink from penetrating into the medium 50, as illustrated in FIG. 3(b). Though a trace amount of ink may penetrate into the medium, a significant amount of ink may be prevented from penetrating into the medium, as compared with the known art in which the ultraviolet light sources 104 are not used.

Since the medium 50 used in the printing apparatus 10 of this embodiment is not particularly limited to any particular types of mediums, any ink-impermeable (non-permeable, non-absorbable) mediums may possibly be used as the medium 50 in the printing apparatus 10.

FIG. 3(c) is a cross-sectional view of an example of the medium 50, which is a non-permeable medium, after the printing operation is over. When any non-permeable medium is the print target medium, such medium 50 does not absorb ink even before its viscosity is increased under ultraviolet radiation or heating by the printing heater 22. The ink may remain thick on the surface of the printing-completed medium 50. In this instance, the ink may be increased in viscosity under ultraviolet radiation using the ultraviolet light sources 104, so that the occurrence of ink bleeding may be prevented. This embodiment may enable improved printing for the medium 50, while suppressing the risk of ink bleeding.

Since absorption of ink into the medium 50 is avoidable, the amount of ink ejected and adhered to the medium 50 may be decreased, as compared with use of any permeable mediums as the medium 50. As a result, the risk of ink bleeding may be adequately suppressed, and color printing at higher concentrations may be feasible with a reduced amount of ink.

Various technical features associated with this embodiment are hereinafter described in further detail. The description starts with higher printing speeds enabled by this embodiment.

In this embodiment, the ink that landed on the medium 50 is irradiated with ultraviolet light emitted from the ultraviolet light sources 104 and is thereby increased in viscosity before starting to bleed, as described earlier. Therefore, higher printing speeds may be feasible by increasing the amount of ink landing on the medium per unit area and per unit time.

Inkjet printing, as in the printing apparatus 10 of this embodiment, often employ multi-pass printing in which multiple main scans are performed at each of positions on the medium 50. In a printing operation according to the known art using evaporation drying ink, the amount of ink ejected in one main scan (pass) may need to be decreased to prevent the occurrence of ink bleeding.

Assuming that one-pass printing, instead of multi-pass printing, is employed in which a single main scan is performed at each position on the medium 50 using, for example, four YMCK color inks conventionally often used as color printing inks, the amount of ink is 100% at most per color and is 400% in four colors in total. Such a large amount of ink ejected in one main scan in the known art may usually start to bleed, possibly resulting in printing failure.

The known printing apparatuses conventionally employ multi-pass printing with at least eight passes or more, in which the amount of ink ejected in one main scan is 12.5% at most per color and is 50% in four colors in total. Printing with a higher precision may demand a larger number of passes (for example, 16 passes, 32 passes). Thus, the known art requires a certain number of passes or more to ensure that ink bleeding does not occur. A larger number of passes, however, may significantly lower the printing speed. In the known art, therefore, difficulty of higher-speed printing may be a bigger issue than the risk of ink bleeding during the process to dry the ink solvent.

In this embodiment, while the amount of ink landing on the medium per unit area and per unit time may increase with a smaller number of print passes, the ink may be prevented from bleeding by having the solvent volatilized away from the ink under ultraviolet radiation. When the multi-pass printing is employed, higher printing speeds may be thus feasible with an appropriate decrease of the print passes. As a result, the risk of ink bleeding may be more effectively avoidable at higher printing speeds beyond limitations of the known methods.

When the amount of ink ejected per unit area and per unit time increases to an extent that ink bleeding is inevitable with, for example, eight or less print passes (one to eight passes) and using the printing heater 22 alone, this embodiment using the ultraviolet light sources 104 may prevent the occurrence of ink bleeding. Therefore, print results improved in quality as compared with the known art may be obtained. This embodiment may provide a high-speed printing apparatus (printer) with eight or less print passes.

For higher printing speeds, the number of print passes may be less than eight (for example, less than or equal to four). Any effect to prevent bleeding expected from use of the ultraviolet light sources 104 may be particularly noticeable when, for example, the number of print passes is around one to four. This embodiment is not necessarily limited to multi-pass printing but is applicable to one-pass printing.

When ink with a very slow drying rate is used, a particularly noticeable effect may be obtained even with four or more print passes. In a printing operation with a larger number of passes than eight, an outstanding bleeding-preventive effect may be obtained by using the ultraviolet light sources 104. A possible example may be multi-pass printing with approximately 32 or less print passes (for example, 16 to 32 passes).

The bleeding-preventive effect expected from use of the ultraviolet light sources 104 may be an advantage for any printers but high-speed printers as well. When, for example, the medium 50 likely to undergo ink bleeding, like paper or fabric, is used, the bleeding-preventive effect may be greatly enjoyed in any printing operations but high-speed printing. The printing apparatus 10 of this embodiment is not necessarily limited to particular fields (e.g. SG field) such as high-speed printing but is also applicable to various printing-related fields. In this embodiment, adjacent ink dots may be sufficiently increased in viscosity before they start to merge into one another. The ink dots may possibly merge into one another, possibly generating a streak-like pattern. Such an unwanted event may be avoided in this embodiment.

The features of inks used in this embodiment are hereinafter described in further detail. As described earlier, ink used in this embodiment contains such materials as an ultraviolet absorbent, solvent, and colorant. Suitable examples of the ultraviolet absorbent may include materials having absorption characteristics suitable for the wavelength of ultraviolet light emitted from the ultraviolet light sources 104. For example, ultraviolet absorbents desirably used may exhibit intense light absorbency for the luminous wavelength range of the ultraviolet light source 104 such as UVLED. Optionally, ultraviolet light sources 104 desirably used may emit ultraviolet light in a wavelength range absorbable by an ultraviolet absorbent added to ink. The luminous wavelength range of the ultraviolet light sources 104 may desirably be substantially identical to that of the ultraviolet absorption band of an ultraviolet absorbent added to ink.

Specifically, the ultraviolet light sources 104 may radiate ultraviolet light having a wavelength less than or equal to 410 nm. Suitable examples of such an ultraviolet light source 104 may include light sources using UVLED having a luminous center wavelength in near ultraviolet range (for example, 250 to 410 nm or 250 to 400 nm). In that case, an ultraviolet absorbent having intense absorbency for a predetermined wavelength range of ultraviolet light having a wavelength less than or equal to 410 nm is added to ink and irradiated with the ultraviolet light sources 104. In this instance, an ultraviolet absorbent desirably used may selectively absorb ultraviolet light of a wavelength range emitted from UVLED used as the ultraviolet light sources 104, while exhibiting no remarkable absorption characteristics for the visible light range. Selectively absorbing ultraviolet light of a wavelength range emitted from UVLED may include exhibiting absorption characteristics particularly for near luminous wavelength of UVLED used as the ultraviolet light sources 104. Exhibiting no remarkable absorption characteristics for the visible light range may indicate substantial transparency to visible light. With the technical aspects described thus far, ink on the medium 50 may be directly and selectively heated by ultraviolet radiation so as to volatilize the solvent away from the ink.

As for absorption characteristics, the ultraviolet absorbent may have 10% or more of ultraviolet absorptivity under the conditions of ink thickness of 20 μm and UVLED ultraviolet radiation in the wavelength range of 250 to 410 nm. The ultraviolet absorptivity under the conditions may desirably be 20% or more. The absorption characteristics for light in the visible light range may be such that ΔE color difference between color tones before and after an ultraviolet absorbent is added to ink of a basic color such as Y, M, C, R, G, or B may be 20 or less in the L*a*b* color system. The ΔE color difference generated by adding an ultraviolet absorbent may desirably be 10 or less.

The ultraviolet absorbent used in this embodiment may be selected from the known ultraviolet absorbents characterized as described so far. The ultraviolet absorbent added to the ink of this embodiment may be one selected from, for example, benzotriazole-based ultraviolet absorbents, liquid ultraviolet absorbents, triazine-based ultraviolet absorbents, benzophenone-based ultraviolet absorbents, and benzoate-based ultraviolet absorbents.

The benzotriazole-based ultraviolet absorbent may be selected from TINUVIN P, TINUVIN 234, TINUVIN 326, TINUVIN 328, and TINUVIN 329. The liquid ultraviolet absorbent may be selected from TINUVIN 213 and TINUVIN 571. The triazine-based ultraviolet absorbent may be TINUVIN 1577 ED. The benzophenone-based ultraviolet absorbent may be CHIMASSORB 81. The benzoate-based ultraviolet absorbent may be TINUVIN 120. The ink of this embodiment may contain a benzimidazole-based ultraviolet absorbent.

The triazine-based ultraviolet absorbent may be a hydroxyphenyl triazine-based ultraviolet absorbent for its suitable absorbency for ultraviolet light having a wavelength less than 360 nm. The hydroxyphenyl triazine-based ultraviolet absorbent may be selected from TINUVIN 400, TINUVIN 405, TINUVIN 460, and TINUVIN 479.

Among the mentioned examples, "TINUVIN" and "CHIMASSORB" are the registered trademarks. The ultraviolet absorbents with these trademarks are manufactured and supplied by BASF Corporation. One of these ultraviolet absorbents may be singly used, or two or more of them may be combined and used in the ink used in this embodiment.

The ultraviolet absorbent may have transmittivity of 60% or more for light in the visible light range. This may allow the ultraviolet absorbent to be substantially transparent to visible light so as to minimize any color change of ink possibly caused by using the ultraviolet absorbent. The transmittivity of the ultraviolet absorbent to light in the visible light range may be 70% or more, desirably 80% or more or 90% or more. The ultraviolet absorbent thus characterized may be allowed to have a high degree of transparency, with little absorption of visible light. As a result, possible cloudiness and poor color brightness of ink due to absorption of visible light may be avoided.

In the ink of this embodiment, the ultraviolet absorbent may be dissolved or dispersed in the solvent. Instead of the ultraviolet absorbent being directly dissolved or dispersed in the solvent, the ultraviolet absorbent may be dissolved or dispersed in the other components of the ink. An example of the other components may be resin included as a component in the ink. Dispersing the ultraviolet absorbent in the resin component may include dispersing the ultraviolet absorbent in solid state in a binder resin.

The resin component may be a binder resin. By dissolving or dispersing the binder resin in the solvent, the ultraviolet absorbent may be dissolved or dispersed in the solvent. In case an ultraviolet absorbent-containing latex ink is used, the ultraviolet absorbent may be dissolved or dispersed in the latex resin.

This embodiment may use any one selected from the organic ultraviolet absorbents mentioned earlier. For example, the resin component, after the organic ultraviolet absorbent is dissolved or dispersed therein, may be dispersed in the solvent, or the organic ultraviolet absorbent may be directly dissolved in the solvent. The ultraviolet absorbent may be selected from any other suitable materials but the before-mentioned ones. For example, the ultraviolet absorbent may be an inorganic material. For example, transparent fine particles of zinc oxide or titanium oxide may be dispersed in the solvent. In this instance, the resin component in which the ultraviolet absorbent has been dispersed may be dispersed in the ink solvent.

In case the principal component of the solvent is water or one or more of organic solvents, the ultraviolet absorbent may be insoluble in the solvent. The principal component of the solvent is a component having a largest content among all of the solvent components in liquid state. Instead of the ultraviolet absorbent being directly dissolved or dispersed in the solvent, the ultraviolet absorbent may desirably be dissolved or dispersed in the other components of ink. For example, the ultraviolet absorbent may be granulated into fine particles and then dispersed in the solvent.

In this embodiment, the solvent is the principal component of ink. The principal component may be a component more included than any other components in terms of weight ratio. In the ink of this embodiment, the solvent may be a component that accounts for 50 wt. % or more to the total ink weight. The ink having such a composition may have a degree of viscosity low enough to be ejected from the inkjet heads 102 by an inkjet scheme. Examples of the ink solvent may include water and a solvent (organic solvent) whose principal component has a boiling point lower than or equal to 200° C.

When such ink that landed on the medium 50 is irradiated with ultraviolet light, its principal component, solvent, may be evaporated so as to prevent the occurrence of ink bleeding. By thus evaporating the solvent, the evaporation drying ink may be reliably fixed (fixed by drying) to the medium 50.

Because the ink may be dried in short time under ultraviolet radiation, inks and mediums 50 that can hardly be paired in the known art may be combined and used. Specifically, various types of evaporation drying inks may be used with, for example, a paper medium 50 with no ink receiving layer formed thereon or a fabric medium 50 subjected to no pretreatment. This may lead to significant reduction of printing costs.

For example, fabrics, porous mediums, and mediums made of non-permeable PET and PC (polycarbonate) may be difficult to use in the known art in combination with the conventional solvent inks due to such a high risk of ink bleeding. Such mediums 50 may be used with the solvent inks to perform printing adequately by further using the ultraviolet absorbent and heating under ultraviolet radiation. Similarly, some mediums 50, which may be difficult to use in the known art in combination with the conventional latex inks in the known art due to such a high risk of ink bleeding, may be used with the latex inks to perform printing adequately by further using the ultraviolet absorbent and heating under ultraviolet radiation. In this embodiment, therefore, various inks having different features may be used with a broader range of different mediums 50.

The ink of this embodiment contains a colorant to produce color. While the ink colors are not particularly limited, this embodiment uses YMCK color inks each having the composition described earlier. Any other color inks, if additionally used in the printing apparatus 10, may desirably have the same composition. Examples of the other color inks may include white, clear-colored, red (R), green (G), blue (B), and orange (Org) inks.

The ultraviolet absorbent-containing ink conventionally often used may be an ultraviolet-curable ink (UV ink) containing, for example, a monomer. The ultraviolet absorbent used in the ink of this embodiment may be similar or identical to ones used in the known ultraviolet-curable inks.

Comparing the ink of this embodiment with any known ultraviolet-curable ink, there is a distinct difference between these inks in terms of events resulting from ultraviolet light being absorbed by the ultraviolet absorbent. In the known ultraviolet-curable ink, the ink is cured and fixed to the medium through polymerization of the monomer triggered by ultraviolet radiation. In this instance, it is a chemical event that is triggered by ultraviolet radiation.

On the other hand, this embodiment evaporates the solvent in the ink, instead of polymerization-induced curing, so as to fix the ink to the medium (fixing by drying), in which the ultraviolet absorbent serves as a heat source that generates heat in response to ultraviolet radiation. The ultraviolet-induced event is thus a physical event, which is totally different to the event that occurs with the ultraviolet-curable ink.

The mechanism of ink being irradiated with ultraviolet light from the ultraviolet light sources 104 is hereinafter described in further detail. Known examples of the ultraviolet light source may include ultraviolet lamps, other than semiconductor light sources such as UVLED and ultraviolet LD. Theoretically, an ultraviolet lamp may be usable as the ultraviolet light source 104 instead of the semiconductor light source.

However, high-speed ON/OFF is not possible with the ultraviolet lamps, unlike the semiconductor light sources. Another issue with the ultraviolet lamps may be a greater area heated at once than UVLED. When the ultraviolet lamps are desirably used as the ultraviolet light sources 104 at high temperatures so as to quickly volatilize and remove the solvent, any poorly heat-resistant mediums can no longer be used as the medium 50. If the ultraviolet lamps are used under such circumstances, the ink and the medium 50 may be discolored or burnt.

The ultraviolet lamps generally have poor conversion efficiency for ultraviolet light and emit light abundantly including visible light ineffective for heating. Such ultraviolet lamps may fail to selectively heat the ink alone, possibly heating the medium 50 and other elements nearby, as well as the ink. Most of energy supplied to the ultraviolet lamp may be converted into heat and dissipated through the medium 50. Such energy loss may result in poor efficiency of energy use for drying the ink.

As described earlier, a suitable example of the ultraviolet light source 104 may be a semiconductor light source such as UVLED because of efficient ultraviolet radiation within a specific wavelength range. By using ink containing an ultraviolet absorbent suitable for a wavelength range of ultraviolet radiation, heating efficiency may improve, with adverse impacts on the medium 50 being controlled. As a result, the occurrence of ink bleeding may be successfully prevented.

The intensity of ultraviolet irradiation from UVLED has significantly been improving in tandem with the advancement of technology in recent years (for example, in about the last five years), which provides improved accessibility to an irradiation intensity required to volatilize and remove a solvent from ink. This is another reason why a UVLED-equipped ultraviolet light source may desirably be used. High-speed ON/OFF is possible with the semiconductor ultraviolet light sources, unlike the ultraviolet lamps. The ultraviolet light sources 104 using UVLED, therefore, may be swiftly turned on and off as required.

The ink on the medium 50 may desirably be heated at once in short time by the ultraviolet light sources 104. The ultraviolet light sources 104 may radiate ultraviolet light so that continuous irradiation time for the same position on the medium 50 is smaller than the thermal time constant of heat dissipation from the medium 50. The ink solvent may desirably be heated under such ultraviolet radiation over such continuous irradiation time until a temperature higher than the solvent's boiling point is reached at the position of ultraviolet radiation. The boiling pint of the ink solvent may be the boiling point of the solvent added as the principal component to the ink.

By heating the ink solvent to higher temperatures than its boiling point, the solvent may be instantly evaporated and thereby prevented from bleeding. Further, possible ink bleeding may be prevented not only in a direction along the surface of the medium 50 but also in a direction along the thickness of the medium 50. As described earlier, the ink may be increased in viscosity before much of the ink is absorbed into the medium 50 so that the ink is abundantly left on the surface of the medium 50. When a permeable medium is used as the medium 50, color and black-and-white images may be both printed at higher concentrations, and clear, high-quality print results may be accordingly obtained.

Hereinafter, heat dissipating from the medium 50 being heated is described in further detail. When the ink is irradiated with ultraviolet light and thereby heated, there are factors that need to be considered, for example, quantity of heat lost through the medium 50, and thermal energy loss. When the intensity of ultraviolet irradiation from the ultraviolet light sources 104 is relatively low, temperatures high enough may be difficult to reach due to heat dissipation through the medium 50, possibly resulting in failure to prevent ink bleeding.

To reduce any impacts from the quantity of heat dissipating through the medium 50 (temperature drop) and thermal energy loss, the ink may be irradiated with intense ultraviolet light to an extent that the medium 50 and the ink thereon are not burnt, so that a temperature close to the boiling point of the solvent principal component is reachable in short time. In this instance, continuous ultraviolet irradiation time may desirably be adequately shorter than the thermal time constant τ of heat dissipation from the medium 50, as described earlier. Thus, a temperature close to the boiling point of the principal component of the ink solvent may be reached in short time.

The rate of transmission of heat dissipating through the medium 50 is decided by the thermal time constant τ calculated in the following formula.

$$\tau(\text{thermal time constant}) = \text{thermal capacity} \times \text{thermal resistance} = \text{thermal capacity} \times \text{thickness/thermal conductivity}$$

When the ink is irradiated with intense ultraviolet light in shorter time than the thermal time constant τ of the medium 50, the ink may be adiabatically heated, which may reduce heat loss. The thermal time constant τ of the medium 50 may be variable with the material and thickness of the medium 50.

FIG. 4 describes the thermal time constant τ of the medium 50 in further detail. This drawing illustrates a result of calculated thermal time constant when a medium 50 made of vinyl chloride (vinyl chloride sheet) is used. The thermal time constant τ of the medium 50 may be calculated as illustrated in FIG. 4. In the illustrated example, the thermal time constant is 9.18 seconds. Thus, the thermal time constant of a regular vinyl chloride film approximately 1 mm in thickness may be nearly 10 seconds.

The thermal time constant may be substantially equal among most of other types of mediums 50 (for example, mediums made of various plastic materials). The thermal time constant is a few seconds or more in the conventional plastic mediums (for example, approximately five seconds or more). The continuous irradiation time of the ultraviolet light sources 104 may be three seconds or less, or desirably 0.2 seconds or less.

The inventors of this invention learnt through the tests that an ink layer on the medium 50 alone may be efficiently heated to high temperatures by thus setting the continuous ultraviolet irradiation time. They also learnt of improved thermal efficiency with continuous irradiation time of 0.1 seconds or less.

In the printing apparatus 10 of this embodiment, the ultraviolet light sources 104 are moved during main scans at the same moving speed as the inkjet heads 102. The duration of heating under ultraviolet radiation (continuous irradiation time) may be adjusted by adjusting the widths of the ultraviolet light sources 104 in the main scanning direction. The moving speed of the inkjet heads 102 during main scans is usually approximately 500 to 1,000 mm/s. When the widths of the ultraviolet light sources 104 in the main scanning direction are set to approximately 50 mm, the continuous irradiation time for the same region on the medium 50 is 50/(500 to 1,000)=approximately 0.1 to 0.05 second. The continuous irradiation time may be thus appropriately decided and set.

The ink heating temperature may be adjusted by changing the irradiation intensity of the ultraviolet light sources 104. As a result, the solvent may be appropriately and sufficiently volatilized away from the ink within the preset continuous irradiation time. Moving the ultraviolet light sources 104 during the heating may ensure short-time heating using powerful ultraviolet light at different positions on the medium 50, while preventing the possibility of the medium 50 and the ink thereon being overheated and burnt.

If powerful ultraviolet light is used over longer continuous irradiation time, unlike this embodiment, the medium 50 may be likely to burn. To avoid that, weak ultraviolet light may have to be used not to burn the medium 50 when the continuous ultraviolet irradiation is extended. In that case, most of heat generated by ultraviolet radiation may dissipate through the medium 50, failing to increase the ink temperature. This may result in failure to adequately volatilize the solvent away from the ink under ultraviolet radiation and to prevent the occurrence of ink bleeding. This embodiment effectuate short-time irradiation of powerful ultraviolet light through main scans so as to adequately heat the ink while preventing the medium 50 from being overheated and burnt.

The irradiation intensity (energy required of the ultraviolet light sources 104) necessary for heating the ink (constant-rate heating of ink layer), and heat loss through the medium may be calculated as described below. The irradiation intensity (energy) necessary for heating the ink may be expressed by the formula 1); $\alpha Ei = (10 \times D \times 4.2)$ (Joule), where D (cm) is the thickness of ink on the medium 50, α is the absorptivity of ultraviolet light into ink, 4.2 (Joule/gr) is the specific heat of ink, and Ei is an irradiation energy required for 10° C. increase of the temperature of an ink layer having the area of 1 cm² and thickness of D (cm).

$$\text{When } D(=20 \text{ μm})=0.002 \text{ cm}, Ei \approx 0.083/\alpha \text{ (Joule/cm}^2\text{)} \quad \text{formula 2)}.$$

When the continuous irradiation time using UVLED as the ultraviolet light sources 104 is one second and α=0.5, the irradiation intensity required of UVLED is expressed by the formula 3); 0.166 (W/cm²).

As for the quantity of heat dissipating from the medium (amount of heat loss energy), energy loss E1 per second (Joule/sec.) through the medium 50 in the area of 1 cm² (per 1 cm²) may be calculated by the formula 4); $E1 = (0.25 \times 10 \times 0.0001/0.001) = 0.25$ (W)(Joule/sec.) provided that the thermal conductivity is 0.25 (W/mK), thickness of the medium 50 is 1 mm, and temperature difference between front and back surfaces of the medium 50 is 10° C.

The energy loss E1 may be rephrased as heat loss during constant-rate heating in which the medium 50 is heated at a slow pace. It is known from comparison of the formulas 3) and 4) that more energy than energy required of heating the ink layer is lost through the medium 50 during slow-paced heating under general equilibrium conditions.

These formulas may teach that an effective means to avoid such energy loss is fast-paced heating by radiating powerful ultraviolet light from the ultraviolet light sources 104 over continuous irradiation time shorter than the thermal time constant (=thermal capacity×thermal resistance) of the medium 50. Under conditions set for short-time heating with less heat loss, efficient heating may be feasible by feeding a relatively small amount of energy approximate to the energy calculated by the formula 1). In this instance, the solvent included in the ink may be evaporated at an accelerating pace by instantaneous heating to a temperature higher than or equal to the solvent's boiling point. Yet, there is an upper limit to the rate of heating, which demands a range of temperatures low enough not to burn the ink and the medium 50 in contact with the ink.

The inventors of this invention conducted tests using inks containing known ultraviolet absorbents of different types in combination with the conventional UVLEDs. Through the tests, the risk of ink bleeding was found to be controllable under ultraviolet irradiation with continuous irradiation time of 2 to 0.3 seconds or less, and such conditions that can prevent the medium 50 and ink thereon from being overheated and burnt were found to be feasible. Further, a desirable range of intensities of ultraviolet light radiated from the ultraviolet light sources 104 was also known from the tests, which was to at least 0.3 W/cm$^2$ or more. More specifically, the ultraviolet irradiation intensity may be greater than or equal to 0.5 W/cm$^2$, or desirably greater than or equal to 1 W/cm$^2$ or greater than or equal to 5 W/cm$^2$. The inventors further conducted tests and discussed optimal conditions, which taught them that types of the ultraviolet absorbent and UVLED to be used are not necessarily limited but are optional.

The inventors verified changes in the ink temperature when the ultraviolet absorbent-containing ink was irradiated with ultraviolet light from UVLED. Through the tests, the inventions were led to the following facts; the ink was suitably fixed to the medium 50 when heated to approximately 100 to 170° C., the ink was burnt at high temperatures (for example, temperatures over approximately 400° C.), and the ink was likely to burn when the ultraviolet irradiation intensity was approximately 1 W/cm$^2$ or more and the continuous irradiation time was longer than the thermal time constant of the medium 50.

To suppress the risk of ink bleeding, the ink may need to be irradiated with ultraviolet light under the described conditions over a predetermined period of time before the ink bleeding occurs. The predetermined period of time may be decided in accordance with the medium 50 used and the rate of ink bleeding that depends on, for example, ink viscosity and surface tension. For example, ultraviolet radiation may desirably start within approximately 0.05 to 2 seconds after the ink droplets landed on the medium. The duration of time before ultraviolet radiation starts may be set by adjusting a distance between the inkjet heads 102 and the ultraviolet light sources 104 in accordance with, for example, the moving speed of the inkjet heads 102 during main scans.

Next, modified examples and exemplified applications of the printing apparatus 10 according to this embodiment are hereinafter described. The description hereinafter given may include some of the matters already described earlier.

So far were described examples using, as the medium 50 of the printing apparatus 10, permeable mediums on which ink is likely to bleed, for example, paper and fabric (for example, sewn products such as T-shirts). This embodiment may offer a distinguished bleeding-preventive effect in high-speed printing for such permeable mediums with high possibilities of ink bleeding.

In the printing apparatus 10, the medium 50 may be selected from permeable mediums and also from a variety of other types of mediums including non-permeable mediums, and fast drying of ink may allow any one of these mediums to effectively avoid ink bleeding. Specifically, the medium 50 used in the printing apparatus 10 may be selected from porous mediums, non-permeable plastic films (for example, PET) and vinyl chloride sheets, and polycarbonate mediums. While some mediums may be unsuitable for use in the conventional printing apparatuses because of a high risk of ink bleeding, bleeding-preventive fast drying may render such mediums 50 suitable for high-resolution color printing.

In this embodiment that may prevent the occurrence of ink bleeding without subjecting the medium 50 to any special pretreatment, clear, high-quality printing results at higher concentrations may be obtained with, for example, paper products with no ink receiving layer formed thereon and fabrics and fabric products such as T-shirts (sewn products) subjected to no pretreatment. This may lead to successful reduction of printing costs. In this embodiment, the medium 50 may be thus selected from a broad range of mediums including permeable mediums with no ink receiving layer formed thereon (paper, fabric) and non-permeable (non-absorbable) mediums (for example, mediums with no coating thereon). The medium 50, however, may be a medium with an ink receiving layer formed thereon.

The printing apparatus 10 illustrated in FIGS. 1(a) and 1(b) performs bidirectional main scans. In a modified example, the printing apparatus 10 may perform main scans in one direction (unidirectional printing), in which case one ultraviolet light source 104 may be disposed on one side of the inkjet heads 102 alone, i.e., at a position behind the inkjet heads 102, during main scans.

The specific features of the printing apparatus 10 may be modified otherwise in various manners. The colors of the inks used in the inkjet heads 102 (color inks) are not necessarily limited to any particular colors. In the inkjet heads 102, other feature colors may be used instead of YMC colors, for example, Y, M, C, R, G, and B, white, pearl, metallic, fluorescent, and phosphorescent colors. The number of such feature colors is not particularly limited and may be one or more.

The printing apparatus 10 may be configured as, for example, a line printer instead of a serial printer that performs main scans, insofar as the ink that landed on the medium 50 can be irradiated with ultraviolet light. In this instance, the ultraviolet light sources 104 (for example, ultraviolet LED device) may be disposed more downstream than the inkjet heads 102 in the transport direction of the medium 50. In the printing apparatus 10 configured as a line printer, the ultraviolet light sources 104 may be disposed on the downstream side separately or collectively for the ink colors.

In the printing apparatus 10 configured as a serial printer, the ultraviolet light sources 104 may be disposed at any positions but positions adjacent to (on both sides of) the inkjet heads 102 in the main scanning direction. For example, the ultraviolet light sources 104 may be disposed at positions more downstream than the inkjet heads 102 in the transport direction of the medium 50. The ultraviolet light sources 104 may be disposed at a position adjacent to the inkjet heads 102 in the main scanning direction and at a position more downstream than the inkjet heads 102 in the transport direction. In the printing apparatus 10 thus structured, the ultraviolet light source 104 at a position more downstream than the inkjet heads 102 in the transport direction may function as an after-heating ultraviolet light source.

As described earlier, the energy of ultraviolet radiation from the ultraviolet light sources 104 (largest irradiation energy supplied) depends on the irradiation intensity and irradiation time of ultraviolet light from the ultraviolet light sources 104. The largest irradiation energy supplied may need to be set within such a range that can prevent the medium 50 and the ink thereon from being burnt. In order to set the largest irradiation energy supplied to stay within an optimal range, at least one of the irradiation intensity and irradiation time of ultraviolet light from the ultraviolet light sources 104 may be automatically changed based on at least one of the printing speed, number of print passes, and density of ink dots formed on the medium 50 (print dot density), or may be manually changed by an operator.

In this embodiment, the ultraviolet light sources 104 irradiate the ink layer on the medium 50 with ultraviolet light, while moving with the inkjet heads 102 during main scans. The amount of ultraviolet radiation from the ultraviolet light sources 104 toward the ink layer may desirably be at least even within a range of widths of ejection in an equal length of time. This may mean that the amount of ultraviolet radiation is desirably even within a range of widths in which the ink droplets are ejected from one inkjet head 102 in at least one main scan (widths of ejection in the same pass).

As described earlier, the ultraviolet light sources 104 are not necessarily limited to UVLED but are selectable from laser light sources including semiconductor lasers (ultraviolet LD). When the source of ultraviolet light is a laser light source, a beam expander or a semi-cylindrical lens (a cylindrical lens) may be used so as to evenly irradiate a certain area with ultraviolet light. In this instance, light beam may be expanded in the direction of nozzle arrays of the inkjet heads 102, while the light beam is focused on a certain region in one direction included in the moving direction of the inkjet heads 102 (main scanning direction). This may allow ultraviolet light to be evenly and appropriately radiated toward a certain area.

The directivity of ultraviolet light emitted from the ultraviolet light sources 104 may desirably be set such that ultraviolet light neither arrives at nozzle surfaces of the inkjet heads 102 nor heats ink left in nozzles. More specifically, the directivity of ultraviolet light emitted from the ultraviolet light sources 104 may be set such that ultraviolet light is not directed toward the inkjet heads 102. The directivity of ultraviolet light may also be set such that ultraviolet light reflected from the medium 50 toward the inkjet heads 102 (reflective component) is adequately reduced.

During main scans, the ultraviolet light sources 104 move with the inkjet heads 102 in the main scanning direction, while continuing to radiate ultraviolet light (continuous lighting control). Instead of the continuous lighting control, pulse lighting may be employed for ultraviolet radiation from the ultraviolet light sources 104.

The inkjet heads 102 that eject ink droplets of different colors (for example, inkjet heads 102 for YMCK colors) so far described are arranged in the main scanning direction with their positions in the sub scanning direction aligned with one another. The inkjet heads 102 may be arranged otherwise in various manners. Some of the inkjet heads 102 may be displaced from the other inkjet heads 102 in the sub scanning direction. Specifically, the inkjet heads may be dispersedly arranged; for example, the inkjet heads 102 for part of the YMCK colors (one or more colors) may be disposed on Y axis, while the inkjet heads 102 for the other color(s) (one or more colors) may be disposed in the direction of X axis. Disposing the inkjet heads 102 on the Y axis may include disposing the inkjet heads 102 in the main scanning direction with their positions in the sub scanning direction aligned with one another. Dispersedly arranging the inkjet heads 102 in the direction of X axis may include disposing the inkjet heads 102 in the main scanning direction with their positions displaced from one another in the sub scanning direction. This may adequately decrease the amount of inks ejected to the same region in each main scan, thereby more adequately suppressing the risk of ink bleeding.

In the description so far, the ink droplets are directly ejected to the medium 50, a print target, which will directly become a final product when the printing is completed. In a modified example of the printing apparatus 10, the medium used may be a transfer medium. The transfer medium may be a medium from which an image printed thereon will be transferred to another medium.

An exemplified application is hereinafter described that uses the ultraviolet absorbent-containing evaporation drying ink described earlier. As described earlier, such ultraviolet absorbent-containing evaporation drying ink may be rapidly dried under ultraviolet radiation. When a permeable medium, such as fabric, is used, the ink may be less likely to penetrate into the medium or may be prevented from bleeding on the medium. Such ink, therefore, may be suitably used in any printing apparatuses that use fabric mediums (textile printers). For example, a printing apparatus equipped to print high-resolution images or characters on both surfaces of mediums (textile printer adapted for instantaneous heating, high-resolution duplex printing) may be feasible by taking advantage of the instantaneous ink drying technique. Such printing means for both surfaces of a fabric medium is hereinafter described in further detail.

In a printing operation using a conventional ink and a fabric medium, a large portion of the ink may penetrate into the medium, as described referring to FIGS. 2(a) and 2(b). In duplex printing, even a larger portion of the solvent may penetrate into the medium, increasing the risk of ink bleeding. The fabric absorbing a solvent included in the ink may be swollen and deformed (stretched), which makes the medium difficult to maintain precision in size. Faced with such unsolved problems, the known inkjet printing apparatuses using fabric mediums (known digital textile printers) conventionally perform printing for one of surfaces alone of fabric mediums.

While the conventional printing apparatuses may be theoretically usable for duplex printing using fabric mediums, printing images/patterns on two surfaces of the medium at a short time interval may increase the likelihood of ink bleeding. This means that a medium, after an image/pattern is printed on one of its front and back surfaces, may need to be dried over long time by an additional heating means before printing for the other surface starts. This may be a bottleneck in downsizing of and higher printing speeds in the conventional printing apparatuses, eventually making the conventional printing apparatuses practically unusable for duplex printing using fabric mediums.

One-sided printing for fabric mediums may fail to meet a product quality that may be required of luxury products. Specifically, in one-sided printing, a surface opposite to a pattern/image-printed surface is blank, showing its ground color. Such a printed matter may be unsuitable for products often seen from both sides, such as scarves, handkerchiefs, curtains, short curtains for store entrances, and fabrics for clothes, and may fail to satisfy degrees of quality particularly demanded in luxury products. Therefore, improved inkjet printing (digital textile printing) is conventionally desirable in the field of expensive originally-designed fashion items required to satisfy the customers' individual needs.

When the fiber texture of a fabric medium subjected to one-sided printing is changed after washing, for example, its blank backing fabric may be visible on the outer side, which may weaken the color of a printed pattern. Then, apparent fastness to wash and fastness to moisture may be significantly degraded, which is an additional factor that demands an improved printing performance for fabric mediums.

The inventors of this invention came up with the idea of irradiating the ultraviolet absorbent-containing evaporation drying ink with ultraviolet light so as to instantaneously dry the ink, which was found to be an effective means that may prevent abundant ink from penetrating into fabric mediums and lead to successful duplex printing using fabric mediums. Through further studies, the inventors finally determined desirable ink compositions and features of the printing apparatus 10 to succeed in duplex printing using fabric mediums. The exemplified inks and features of the printing apparatus 10 for duplex printing using fabric mediums are hereinafter described in further detail. The description starts with examples of ink used in fabric medium-used duplex printing.

Conventionally, inkjet printing apparatuses using aqueous pigment inks and fabric mediums such as T-shirts (textile printers) are available for commercial use. The printing technique of the known art may allow for use of fabric mediums without subjecting them to pretreatment. The only aftertreatment required of any obtained printed matter is heating for ink drying. The inkjet printing technique using aqueous pigment inks (digital textile printing) and fabric mediums is expected to become more popular in the future.

A known problem with the known art using fabric mediums is, however, penetration of a large portion of ink into the fabric mediums. Problems resulting from the ink penetration may include difficulty of high-quality duplex printing, and lack of clarity in a print result due to paucity of ink remaining on the medium surface.

Examples of the ultraviolet absorbent-containing evaporation drying ink may include inks containing pigments as colorant, because such inks, when instantaneously dried under ultraviolet radiation, may be prevented from abundantly penetrating into or bleeding on the medium. Therefore, high-quality duplex printing may be feasible with fabric mediums. Such inks may facilitate fabric medium-used duplex printing that can obtain a print result rich in color that excels in fastness to wash, substantially without subjecting fabric mediums to any pretreatment.

In the ink having such a composition, the ultraviolet absorbent generates heat under ultraviolet radiation, and the generated heat rapidly dries the ink. The content of the ultraviolet absorbent in the ink may be 0.01 to 10 wt. %, or desirably 0.05 to 3 wt. %, 0.05 to 2 wt. %, 0.05 to 1 wt. %, or 0.1 to 0.4 wt. %.

The pigment of the ink may be selected from the known pigments. The pigment may be a colorant that does not require any special coloring treatment after the ink landed on the medium. The special coloring treatment may be any treatment but heating to evaporate the ink solvent. The pigment may be a colorant exhibiting a color desirably obtained after the printing is over.

Examples of the colorant may include self-color developing pigments that develop colors in the absence of auxiliary agents (for example, inorganic and organic pigments). The pigment may be selected from colored resins, in which case examples of the usable ink may be inks containing aqueous latex resins colored with dyes (aqueous latex pigments for textile printing), inks containing aqueous latex resins colored with disperse dyes (disperse dye-containing aqueous latex inks), or colloidal (suspension) textile printing inks (UV-drying textile printing inks) in which color resin itself colored by including nano-pigment or dye is dispersed.

A component of such ink may be resin that serves as binder resin. The ink having such a composition may be firmly adhered to the medium and may improve in washing fastness. The resin added to the ink may be colorless.

A possible example of the ink colorant may be a colorant that develops color only when heated for solvent evaporation. Another possible example of the colorant may include a disperse (instantaneous drying) dye that develops color only when heated. The colorant used with polyester fabric, nylon fabric, or blended fabric primarily consisting of polyester or nylon may be selected from sublimation dyes.

The ink solvent desirably used with fabric mediums may be an aqueous solvent such as water. This may avoid the risk of any harmful organic solvent being left in products made of the printed fabric, and may alleviate possible environmental load in contrast to volatile organic solvents.

For certain quality required of printing or end use of printed matters, for example, it is conceivable to use an ink containing an organic solvent as a main component of a solvent. The principal component may be a component added to the solvent by 50% or more in terms of weight ratio. The organic solvent may have a boiling point higher than 110° C. The principal component of such an organic solvent may be isoparaffin, and its boiling point may desirably be higher than 120° C.

Possible environmental load may be favorably reduced by using an organic solvent having low volatility. Such an organic solvent having low volatility may also be prevented from bleeding by instantaneous drying of ink under ultraviolet radiation. In case the solvent is such an organic solvent, the ink may contain a binder resin dissoluble in the organic solvent.

Figure 5A:
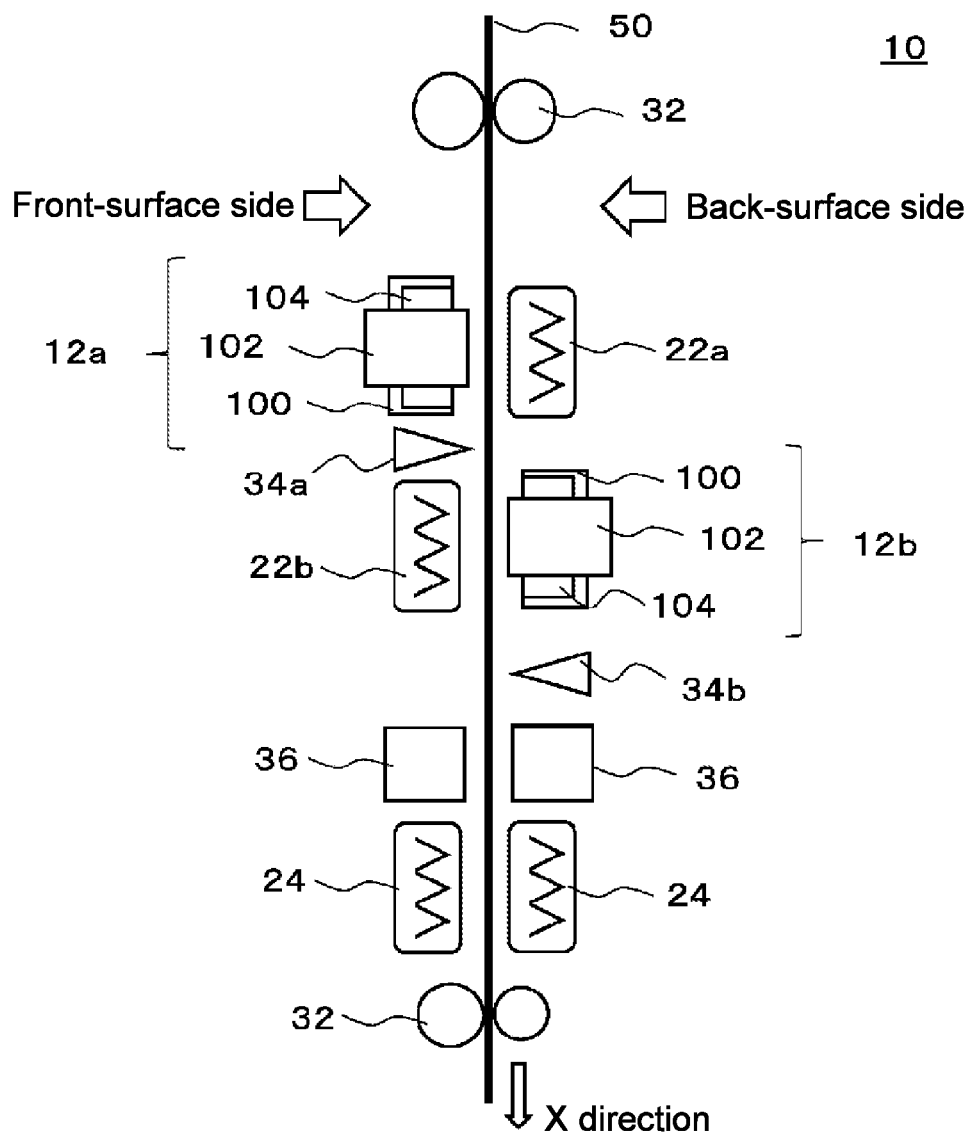
FIGS. 5(a) and 5(b) are drawings that illustrate a modified example of the printing apparatus 10.
Figure 5B:
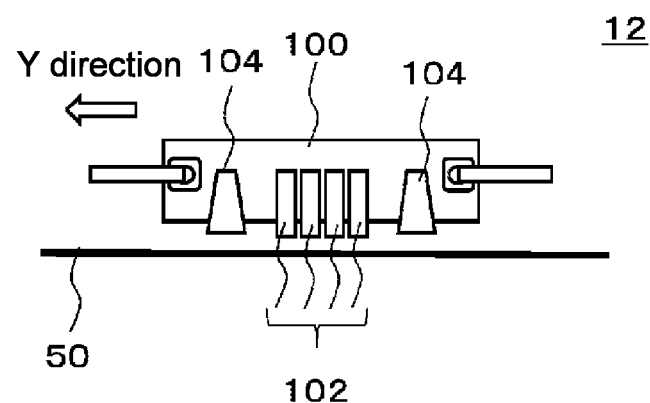

For duplex printing using fabric mediums, the printing apparatus 10 may be reconfigured for duplex printing. FIGS. 5(a) and 5(b) are drawings that illustrate a modified example of the printing apparatus 10. FIG. 5(a) is a drawing that illustrates an example of the printing apparatus 10 adapted for duplex printing using the fabric medium 50. FIG. 5(b) is a drawing of a head unit in the printing apparatus 10, illustrating an example of the head unit viewed in the moving direction of the inkjet head (Y direction) during main scans.

Except for the features described below, the structural elements illustrated in FIGS. 5(a) and 5(b) with the same reference signs as in FIGS. 1(a) to 4 may be identical or similar to the ones illustrated in FIGS. 1(a) to 4. In this modified example, the printing apparatus 10 performs duplex printing for the fabric medium 50 subjected to no bleeding-preventive pretreatment (medium 50 with no coating thereon). Exemplified materials of the fabric medium 50 may include cotton fabrics, blended fabrics of cotton and chemical fiber yarns such as polyester and rayon, and silk, wool, polyester, and Tetron fabrics.

In this modified example, the printing apparatus 10 is an inkjet printer adapted for duplex printing using fabric mediums (duplex textile printer). The structural elements of this printer include a plurality of transport rollers 32, head units 12a and 12b, printing heaters 22a and 22b, position detectors 34a and 34b, after-heating UV irradiators 36, and after-heating means 24. The transport rollers 32 transport the medium 50 to and from different positions on the transport path of the medium 50 in a predetermined sub scanning direction (X direction).

The head units 12a and 12b are in charge of ejecting ink droplets and irradiating the ejected ink droplets with ultraviolet light. In this modified example, the head units 12a and 12b are identically structured and respectively disposed on the front-surface side and back-surface side of the medium 50. The head unit 12a, which is disposed so as to face the front surface of the medium 50 along the transport path, has inkjet heads that eject ink droplets to the front surface of the medium 50 (front-surface inkjet head) and ultraviolet light sources (front-surface UVLED instantaneous drying means). The head unit 12b, which is disposed so as to face the back surface of the medium 50 along the transport path, specifically has inkjet heads that eject ink droplets to the back surface of the medium 50 (back-surface inkjet head) and ultraviolet light sources (back-surface UVLED instantaneous drying means).

In this modified example, the head units 12a and 12b each have a carriage 100, a plurality of inkjet heads 102, and a plurality of ultraviolet light sources 104, as in the head unit 12 illustrated in FIG. 5(b). The carriage 100 is a holder for holding the inkjet heads 102 and the ultraviolet light sources 104.

The inkjet heads 102 are inkjet heads that eject ink droplets of different colors used for printing. The inkjet heads 102 each have a nozzle array parallel to the sub scanning direction and are arranged next to each other in a main scanning direction (Y direction) orthogonal to the sub scanning direction. Examples of the inkjet heads 102 are, for example, inkjet heads for Y, M, C, and K colors. In this modified example, inks ejected from the inkjet heads 102 are each evaporation drying ink containing an ultraviolet absorbent (UV instantaneous-heating ink). This ink is rapidly heated and dried by ultraviolet light radiated from the ultraviolet light sources 104 immediately after landing on the medium 50.

The ultraviolet light sources 104 irradiate the ink that landed on the medium 50 with ultraviolet light. These light sources are respectively disposed on one side and on the other side of the head unit 12 in the main scanning direction, with the inkjet heads 102 being interposed therebetween. The ultraviolet light sources 104 are respectively situated ahead of and behind the inkjet heads 102 during main scans.

In this modified example, the head unit 12 is allowed to perform bidirectional main scans in the same manner or similarly to the head unit 12 of the printing apparatus 10 illustrated in FIGS. 1(a) and 1(b). In case the head unit 12 is configured to perform unidirectional main scans, the ultraviolet light sources 104 may be disposed on one side alone of the head unit 12 in the main scanning direction.

In the printing apparatus 10 thus characterized, the inkjet heads of the head units 12a and 12b can be disposed on both sides of the medium 50, with the medium 50 being interposed therebetween. Thus, duplex printing for both surfaces of the medium 50 may be feasible with one printing apparatus. The head units 12a and 12b are displaced from each other in the transport direction of the medium 50 (X direction) so as to avoid any overlap in position between nozzle arrays of the front-surface inkjet heads 102 and of the back-surface inkjet heads 102. The head unit 12b may be displaced from the head unit 12a in the sub scanning direction by at least a distance (length in the sub scanning direction) greater than or equal to the width of a nozzle array of the inkjet head 102 in the head unit 12a. In this modified example, the head units 12a and 12b are displaced from each other by disposing the head unit 12a on the upstream side in the transport direction, while the inkjet heads 102 on the downstream side in the same direction.

The printing heater 22a heats the medium 50 at a position opposite to the head unit 12a across the medium 50. The printing heater 22b heats the medium 50 at a position opposite to the head unit 12b across the medium 50. The printing heaters 22a and 22b heat the medium 50 at preset temperatures so as to have the medium 50 stay at an initial temperature and avoid any impact of environmental temperature. The heating temperatures of the printing heaters 22a and 22b may be constant temperatures slightly higher than environmental temperature (for example, approximately 30 to 50° C.). The heating temperatures of the printing heaters 22a and 22b, therefore, may be relatively low and substantially equal to room temperature. In this modified example, the ink is heated to be fixed to the medium 50 under ultraviolet radiation from the ultraviolet light sources 104. The printing heaters 22a and 22b may be unnecessary depending on an environment where the printing operation is carried out and/or a printing quality demanded. When the printing operation is carried out in an ordinary room environment in which temperature changes are less likely, for example, the printing heaters 22a and 22b may be unnecessary.

The position detectors 34a and 34b detect positions of images printed on the medium 50. In this modified example, the position detectors 34a and 34b detect positions of predetermined marks drawn by the inkjet heads of the head unit 12a and 12b so as to detect positions of the images printed on the medium 50. Specifically, the head units 12a and 12b print (record) at the same time marks indicating image reference positions, for example, register marks, when images or designed patterns are printed on the medium 50. The position detector 34a is a front mark position detector that detects the position of the mark drawn by the head unit 12a on the front surface of the medium 50. The position detector 34a detects the position of the image drawn by the head unit 12a as well as the mark position. The position detector 34b is a back mark position detector that detects the position of the mark drawn by the head unit 12b on the back surface of the medium 50. The position detector 34b detects the position of the image drawn by the head unit 12b as well as the mark position. In this manner, positions of the images drawn on the front and back surfaces of the medium 50 may be exactly detected.

The position detector 34a is disposed at positions of the head unit 12a and the head unit 12b in the transport direction of the medium 50. The position detector 34b is disposed more downstream than the head unit 12b in the transport direction of the medium 50. With these position detectors thus arranged, the position of the image printed on the front surface of the medium 50 may be detected before the head unit 12b start to perform printing at positions on the medium 50. Then, the position of the image to be printed on the back surface of the medium 50 by the head unit 12b may be suitably adjusted based on information of the position detected by the position detector 34a. At the time, inclination and/or size of the image to be printed may also be adjusted, if necessary.

By having the position detector 34b detect the position of the image printed by the head unit 12b, the image position on the back surface may be detected as well. In this manner, a relationship between positions of the images printed on the front and back surfaces may be determined. In case any misalignment is found on the image printed on the back surface (for example, its position, inclination, or size) is detected, positions of the ink droplets to be ejected from the inkjet heads may be adjusted based on the result of position detection. As a result, the image position may be easily and appropriately adjusted. Thus, duplex printing using the medium 50 may be more favorably performed.

The mark indicating the image reference position may be any suitable one but the register mark selected from variously-shaped marks, for example, painted-out circle. The method of position detection using the position detectors 34a and 34b may be variously modified. For example, transmitted light or reflected light may be used to detect the positions. The marks indicating the reference positions are not necessarily printed by the head units 12a and 12b in the printing operation. Instead, marks previously drawn on the medium 50 may be used. The position detectors 34a and 34b may be disposed more upstream than the corresponding head units 12a and 12b in the transport direction of the medium 50 so as to detect target regions of image printing before the images are printed by the head units 12a and 12b. In this instance, duplex printing using the medium 50 may be favorably performed by adjusting relevant positions in accordance with results of detection by the position detectors 34a and 34b before the images are printed by the head units 12a and 12b.

The after-heating UV irradiators 36 and the after-heating means 24 are both for use in after-heating treatment for the medium 50 (after-heating drying means). The after-heating UV irradiators 36 are disposed on the front-surface side and the back-surface side of the medium 50 and radiate ultraviolet light toward the medium 50 for after-heating of the medium 50. The after-heating means 24 are respectively disposed so as to face the front surface side and the back surface of the medium 50 and heat the medium 50 at preset temperatures for after-heating. Combined use of the after-heating UV irradiators 36 and the after-heating means 24 may reliably dry the ink on the medium 50, allowing the ink to be suitably fixed to the medium 50.

Such after-heating treatment may completely evaporate and remove a portion of the solvent that penetrated into the fabric of the medium 50 (residual solvent). Taking for instance ink containing a pigment and resin such as a binder resin, the resin may allow the pigment to be firmly and stably adhered to the medium 50 after the solvent is completely evaporated. The after-heating UV irradiators 36 and the after-heating means 24 may be unnecessary depending on features of ink used and/or a printing quality demanded. The after-heating means 24 alone may be used for after-heating treatment without using the after-heating UV irradiators 36. Other examples of the after-heating means may include infrared heaters, hot air heaters, and heat rollers.

In this modified example, inks ejected from the head units 12a and 12b that landed on the medium 50 may be irradiated with intense ultraviolet light emitted from the ultraviolet light sources 104 moving with the inkjet heads 102 during main scans. The ultraviolet light emitted toward the ink is converted into heat and rapidly heats the ink layers alone to temperatures substantially equal to or higher than the boiling point. Thus, the solvent in the ink is rapidly (instantaneously) heated. In this modified example, therefore, the risk of ink bleeding may be adequately reduced.

Such instantaneous heating of the ink may adequately decrease loss of heat through the medium 50. In this modified example, the ink alone may be heated to high temperatures only in a region that the inkjet heads 102 passed, therefore, the inkjet heads 102 may be hardly heated by ultraviolet radiation. This may avoid the risk of clogging the nozzles with ink. One selected from solvents having high boiling points (water or organic solvent) may be used as the ink solvent, which may improve the safety and reliability of the printing apparatus 10. For example, ink containing an ultraviolet absorbent having transparency against light in the visible light range may be unlikely to become cloudy or lose color brightness. As a result, a clear print result may be obtained.

In this modified example, ultraviolet light is radiated immediately after the ink droplets landed on the fabric medium 50 so as to instantaneously heat the ink. As a result, the ink solvent (for example, water) may be adequately dried before the ink mostly penetrates into the medium 50, and the ink layers may be formed at high concentrations near the surface of the medium 50. By drying the ink before abundantly penetrating into the medium 50, less ink may be absorbed into the fabric of the medium 50 to prevent swelling of the medium 50, which may prevent possible deformation of the medium 50 absorbing the ink.

In duplex printing, relative displacement between positions of the images printed on the front and back surfaces may be avoided by preventing such deformation of the medium 50. In this modified example, positions of the images are detected by the position detectors 34a and 34b for necessary adjustment of the positions, so that the images printed on the front and back surfaces are accurately and correctly positioned relative to each other. Therefore, high-quality duplex printing may be feasible with the fabric medium 50.

In case the medium 50 absorbing much of the ink is thereby significantly deformed and/or warped, the image positions may be difficult to be accurately detected by the position detectors 34a and 34b. In this modified example, possible deformation of the medium 50 may be avoided by instantaneously drying the ink, which may allow the image positions to be accurately detected by the position detectors 34a and 34b.

In this modified example characterized by instantaneous drying of the ink, duplex printing may be successfully performed with the permeable medium 50 subjected to no bleeding-preventive pretreatment (fabric medium 50). The risk of ink bleeding may be adequately suppressed against any increase of ink landing on the medium 50 per unit area and per unit time. This modified example, therefore, may enable high-speed duplex printing using the permeable medium 50 subjected to no pretreatment, for example, one-pass printing for each of positions on the front and back surfaces of the medium 50. When ink containing a pigment as colorant is used as in this modified example, no special aftertreatment may be unnecessary.

Therefore, high-quality duplex printing may be feasible with the fabric medium 50 in this modified example, promising successful digital duplex printing for textiles that provides clear print results that excel in fastness. Various patterns, for example, may be printed on the front and back surfaces of the fabric medium 50 without misalignment of colors or ink bleeding. Therefore, digital inkjet printing may be applicable to luxury fabrics for clothes, scarves, handkerchiefs, curtains, and short curtains for store entrances that are often seen from both sides. Direct duplex printing may be feasible with the fabric medium 50 subjected to no pretreatment, possibly leading to cost reduction and shorter delivery date.

The description given so far mostly discussed use of ink containing a pigment as colorant. Instead, ink containing a dye as colorant may be used for duplex printing using the fabric medium 50. The printing apparatus 10 illustrated in FIGS. 5(*a*) and 5(*b*) may use various inks containing different dyes, as colorant, assisted by auxiliary agents in color development. Use of dye-containing inks in the printing apparatus 10 of FIGS. 5(*a*) and 5(*b*) is hereinafter described in further detail. The printing apparatus 10 in this instance may be a textile printer adapted for high-resolution duplex printing using dye-containing, instantaneous drying ink for textile printing.

When a pigment is used as colorant in printing for the fabric medium 50 and is desirably firmly fixed to the medium 50, binder resin-containing ink may be conventionally used. Such resin-containing ink, however, may often leave the resin on the surface of the printed medium 50, possibly affecting the feel and texture of a print result. For certain printing purposes, other inks containing no resin may desirably be used. When the print target medium is a fabric medium 50 for use in a luxury fabric product tasteful in design (for example, scarf), inks containing no resin may desirably be used.

When ink containing a dye as colorant is used, the medium 50 may be favorably colored in the absence of resin. For example, dye inks dried by evaporation, such as the known aqueous dye inks (aqueous dye inks for textile printing), may usually contain no solid content such as binder resin or may contain a trace amount of solid component. Such inks containing no solid content may be degraded in viscosity and thereby more likely to bleed. When a conventional dye ink is used with the fabric medium 50 subjected to no bleeding-preventive pretreatment, the ink may abundantly start to bleed. Besides, such pretreatment for the medium 50 may result in time loss and cost increase, as described earlier.

Duplex printing using the medium 50 may double the amount of solvent absorbed into the medium 50, increasing the risk of ink bleeding. There is even a higher risk of ink bleeding with thin materials used in, for example, summer clothes, scarves, and handkerchiefs. Further, the fabric medium 50 may be swollen by the absorbed solvent, which makes the medium 50 difficult to maintain precision in size. Thus, duplex printing using the known dye inks may be particularly difficult to perform with the fabric medium 50.

The inventors of this invention found out through their studies that dye-containing ink, if instantaneously dried under ultraviolet radiation, may be suitably used for duplex printing with the fabric medium 50 subjected to no bleeding-preventive pretreatment. Use of instantaneous drying ink under ultraviolet radiation may include use of the ultraviolet absorbent-containing evaporation drying ink described earlier, or use of ink bleeding-preventable and fixable by rapidly drying the solvent under ultraviolet radiation (instantaneous drying UV ink). Additionally, the printing apparatus 10 of FIGS. 5(a) and 5(b) may enable direct printing for both surfaces of the medium 50.

An example of such ink may be ink containing an ultraviolet absorbent, solvent, and dye. Further, ink suitably used may substantially contain no resin such as a binder resin. The dye is the colorant of ink. Examples of the dye may include various dyes that can dye natural fibers and chemical fibers. Specific examples of the dye may include acid dyes, reactive dyes, disperse dyes, direct dyes, alloy dyes, indanthrene dyes, vegetable-derived dyes, and chemical indigo dyes. Another example of the dye may be aqueous latex dyes for textile printing.

When a dye is used as colorant, an auxiliary agent for color development may be additionally used, if necessary. Examples of the auxiliary agent may be auxiliary agents to prevent uneven dyeing, auxiliary agents for level dyeing, auxiliary agents for color fixation, and auxiliaries to accelerate dye absorption. Other possible examples of the auxiliary agent may include alkali agents for reactive dyes that accelerate color reactions, reducing agents for vat dyes, and acid auxiliaries for acid dyes. The auxiliary agent may be added to ink with a dye. For example, an inkjet head for auxiliary agent-containing ink may be further used, from which the auxiliary-containing ink may be ejected to the same position as dye-containing ink.

When a dye is used as colorant, an aftertreatment may be additionally performed for color development, if necessary. When such a dye that needs to be steamed or heated at high temperatures is used, like reactive dyes and acid dyes, the dye is additionally subjected to aftertreatment using an oven or steamer for color development. When a dye and an auxiliary agent are used, the aftertreatment may be washing the fabric medium 50 with water or a cleaning liquid so as to remove any residual of the auxiliary agent or unreacted dye. In this instance, the washed medium 50 may desirably be dried. If necessary, the medium 50 may be ironed or softened with a softening agent.

As described thus far, the evaporation drying ink containing a dye as colorant may be instantaneously stopped from bleeding by being dried under ultraviolet radiation. Then, clear images or patterns that excel in fastness to wash may be printed at high color concentrations on both surfaces of the fabric medium 50 subjected to no pretreatment.

So far was mostly described the printing operation of the printing apparatus 10 illustrated in FIGS. 5(a) and 5(b) for duplex printing using the fabric medium 50. A printing apparatus 10 differently configured may be used for duplex printing using the medium 50.

Figure 6:
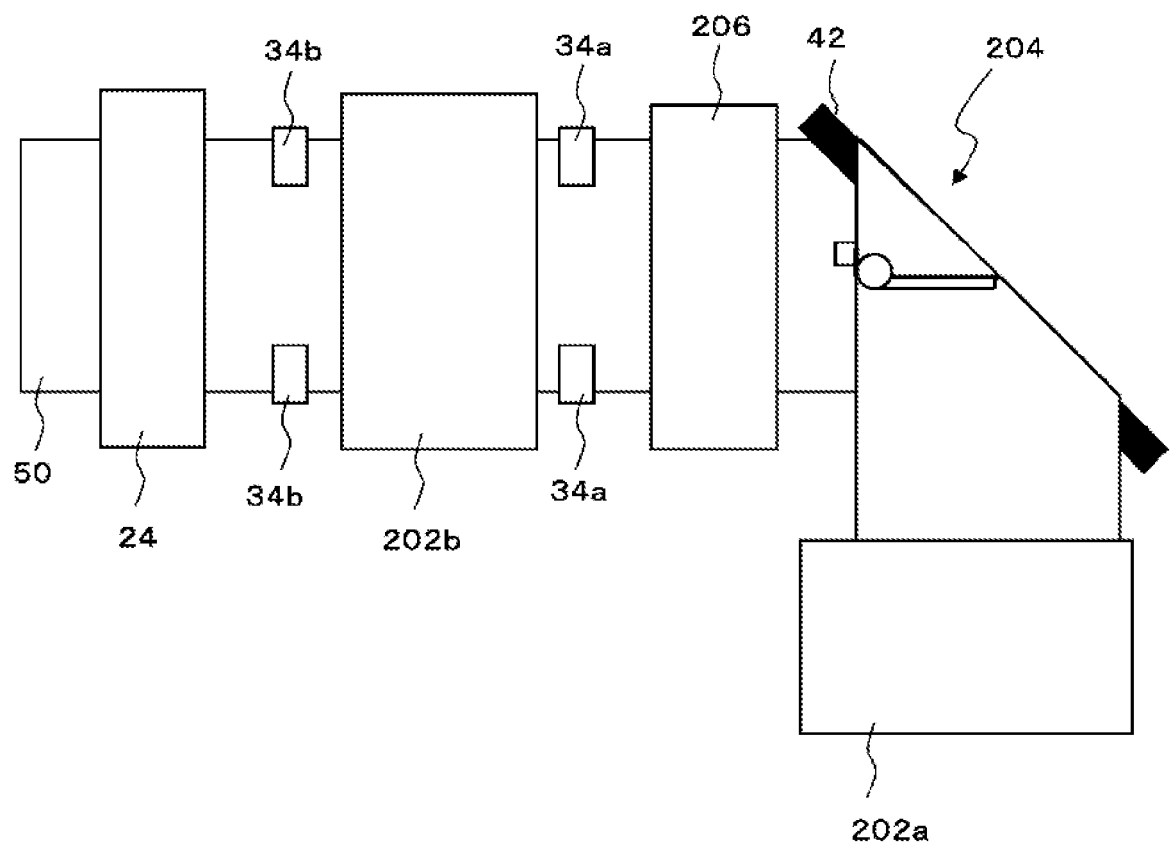
FIG. 6 is a drawing that illustrates another modified example of the printing apparatus 10.

FIG. 6 is a drawing that illustrates another modified example of the printing apparatus 10 adapted for duplex printing using the fabric medium 50. Except for the features described below, the structural elements illustrated in FIG. 6 with the same reference signs as in FIGS. 1(a) to 5(b) may be identical or similar to the ones illustrated in FIGS. 1(a) to 5(b).

In this modified example, the printing apparatus 10 performs duplex printing using the medium 50 and ink similar or identical to the ink used in the printing apparatus 10 of FIGS. 5(a) and 5(b). The printing apparatus 10 includes a plurality of printing units 202a and 202b, a reversing member 204, a tension controller 206, a plurality of position detectors 34a and 34b, and an after-heating means 24.

The printing units 202a and 202b are in charge of ejecting ink droplets to the medium 50 and irradiating the ejected ink droplets with ultraviolet light The printing units 202a and 202b each have a head unit similar or identical to the head unit 12 illustrated in FIGS. 5(a) and 5(b), and a driving unit that drives the head unit to perform main and sub scans. Therefore, a respective one of the printing units 202a and 202b may be considered equivalent to an independent inkjet printer. The printing apparatus 10 may accordingly constitute a printing system equipped with functions of two inkjet printers.

In this modified example, two printing units 202a and 202b are arranged in series along the transport direction of the medium 50 and perform printing operations for the medium 50 at their own positions. The printing unit 202a prints an image or pattern on one of surfaces, front surface, of the medium 50 (front-surface printing). The printing unit 202b prints an image or pattern on the other surface, back surface, of the medium 50 (back-surface printing). In this modified example, the medium 50 is reversed by the reversing member 204 at a position between the printing units 202a and 202b. In the printing apparatus 10, the printing units 202a and 202b are disposed so that ink droplets are ejected from these printing units in the same direction. In the printing apparatus 10, among the printing units equivalent to two inkjet printers arranged in series, the printing unit 202a, first inkjet printer, prints an image or pattern on the front surface of the medium 50, and the printing unit 202b, second inkjet printer, prints an image or pattern on the back surface of the medium 50. The printing unit 202*a* may be a UV instantaneous drying printer for front-surface printing. The printing unit 202*b*, may be a UV instantaneous drying printer for back-surface printing.

The reversing member 204 reverses the medium 50 at an intermediate position on the transport path of the medium 50. In this modified example, the reversing member 204 has a reversing roller 42. The medium 50 is rolled over along the reversing roller 42, with the transport direction of the medium 50 being changed between the printing units 202*a* and 202*b*, so that front and back surfaces of the medium 50 are turned over. The reversing member 204 orthogonally changes the transport direction of the medium 50. In the printing apparatus 10 of this modified example, the printing units 202*a* and 202*b* may be disposed on the transport path bending at a right angle so that the bent part is interposed between these printing units (right-angled continuous duplex printing).

The tension controller 206 adjusts the tension of the medium 50 being transported. In this modified example, the tension controller 206 is disposed between the reversing member 204 and the printing unit 202*b*. The tension controller 206 thus positioned adjusts the tension of the medium 50 that has been reversed by the reversing member 204 before the printing operation of the printing unit 202*b* starts.

The position detectors 34*a* and 34*b* detect positions of images printed on the medium 50 by the printing units 202*a* and 202*b*. By using the position detectors 34*a* and 34*b*, the image positions on the front and back surfaces of the medium 50 may be appropriately adjusted in the same manner as or in a manner similar to the printing apparatus 10 illustrated in FIGS. 5(*a*) and 5(*b*). In this modified example, the position detectors 34*a* and 34*b* detects marks printed on the medium 50, as well as images printed thereon, so as to detect the image positions in the same manner as or in a manner similar to the position detectors 34*a* and 34*b* of the printing apparatus 10 illustrated in FIGS. 5(*a*) and 5(*b*). The position detector 34*a* detects the mark printed by the printing unit 202*a* on the front surface of the medium 50. The position detector 34*a* may be defined as a front surface mark position detector. The position detector 34*a* further detects the position of the image printed by the printing unit 202*a* based on the position of the detected mark. In this regard, the position detector 34*a* may be defined as a means for detection control of front image position. The position detector 34*b* detects the mark printed by the printing unit 202*b* on the back surface of the medium 50. The position detector 34*b* further detects the position of the image printed by the printing unit 202*b* based on the position of the detected mark. In this regard, the position detector 34*b* may be defined as a back surface mark position detector or a means for detection control of front image position. The after-heating means 24 is for use in after-heating treatment for the medium 50.

In this modified example, the ink may be instantaneously dried under ultraviolet radiation and may be thereby prevented from bleeding, as in the earlier examples. Further, duplex printing may be successfully performed with the medium 50 subjected to no bleeding-preventive pretreatment.

In the example illustrated in FIG. 6, the medium 50 is reversed by the reversing member 204. In a modified example of duplex printing means, the medium 50 may be reversed by any other suitable method.

Figure 7A:
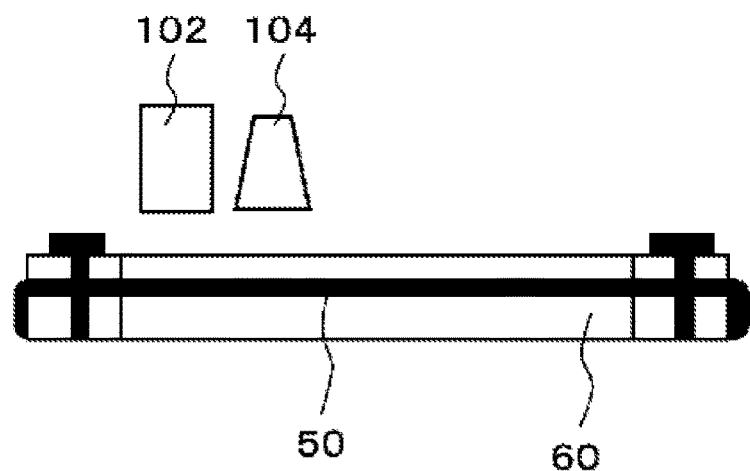
FIGS. 7(a) to 7(c) are drawings that illustrate modified examples of duplex printing.
Figure 7B:
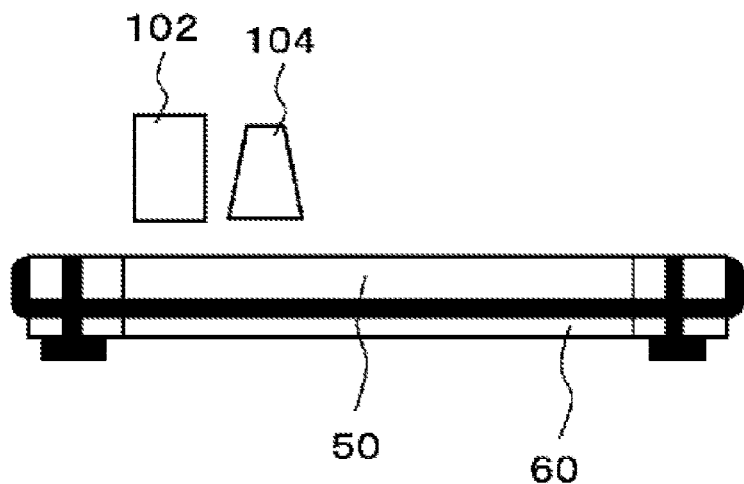

FIGS. 7(*a*) to 7(*c*) are drawings of a modified example of the duplex printing means, illustrating a printing operation in case the medium 50 is reversed with a tool 60. FIG. 7(*a*) is a drawing of an exemplified printing operation for one of surfaces (front surface) of the medium 50. FIG. 7(*b*) is a drawing of an exemplified printing operation for the other surface (back surface) of the medium 50. FIG. 7(*c*) is another modified example of the printing operation for the medium 50. Except for the features described below, the structural elements illustrated in FIGS. 7(*a*) to 7(*c*) with the same reference signs as in FIGS. 1(*a*) to 6 may be identical or similar to the ones illustrated in FIGS. 1(*a*) to 6. While FIGS. 7(*a*) to 7(*c*) illustrate inkjet heads 102 and ultraviolet light sources 104 alone among the structural elements of the printing apparatus, the printing apparatus may use any other means required to print images/patterns on the medium 50.

In the printing operation of this modified example, the printing apparatus is configured to move the inkjet head 102 for sub scans, instead of transporting the medium 50. A suitable example of the printing apparatus may be a flatbed inkjet printer. The printing apparatus in this instance is an inkjet printer that carries out the printing operation for one surface alone of the medium 50 in one printing cycle. In this modified example, color inks used are ultraviolet absorbent-containing inks instantaneously dried under ultraviolet radiation (instantaneous drying UV inks). The printing apparatus 10 includes the inkjet heads 102 that eject droplets of these inks, and ultraviolet light sources 104 that irradiates the inks that landed on the medium with ultraviolet light.

In this instance, the printing operation for the medium 50 starts after a tool that holds the medium 50 (printing tool) 60 is set on the flatbed. A suitable example of the tool 60 may be adjustable in position on the flatbed. In this modified example, as a tool 60, the tool (a surface tension tool) that holds the medium 50 of fabric in a stretched state is used. The tool 60 may be the same as or similar to a tool that holds a printing-target fabric in silk-screen printing (frame for holding a silk screen).

To start duplex printing, the fabric medium 50 is tacked across the tool 60. Then, the tool 60 is set at a position in the printing apparatus. The tool 60 is set so that a printing-target surface of the medium 50 faces the inkjet heads 102 and the ultraviolet light sources 104.

Before an image is printed on the front surface of the medium 50, the tool 60 is set so that the front surface of the medium 50 faces the inkjet heads 102, as illustrated in FIG. 7(*a*). Then, the image to be printed (color image) is printed by the inkjet heads 102 on the front surface of the medium 50. In this modified example, a mark indicating a reference position of the image is also printed in addition to the image printed on the medium 50. Immediately after the ink droplets landed on the medium 50, the ink is irradiated with ultraviolet light from the ultraviolet light sources 104 and thereby dried. As a result, the image is successfully printed on the front surface of the medium 50.

After the image is printed on the front surface, the tool 60 holding the medium 50 is reversed so as to reverse the medium 50 on the flatbed, and the tool 60 is set so that the back surface of the medium 50 faces the inkjet heads 102, as illustrated in FIG. 7(*b*). In this modified example, a mark indicating a reference position of the image alone is printed on the back surface before an image is printed thereon. Immediately after the ink droplets landed on the medium 50, the ink is irradiated with ultraviolet light from the ultraviolet light sources 104 and thereby dried. Then, positions of the marks printed on the front and back surfaces of the medium 50 are detected by position detectors not illustrated in the drawings. Further, any displacement in the in-plane direction (main and sub scanning directions), for example, is calculated based on the detected positions. Then, a position on the back surface at which the image is to be printed is adjusted, if necessary. At the time, a size change of the image may be additionally performed.

After any necessary position adjustment and size correction, the image to be printed is printed by the inkjet heads 102 on the back surface of the medium 50. Immediately after the ink droplets landed on the medium 50, the ink is irradiated with ultraviolet light from the ultraviolet light sources 104 and thereby dried. As a result, the image is successfully printed on the back surface of the medium 50.

By thus drying the ink in short time, high-speed duplex printing may be performed at high ink concentrations, with the risk of ink bleeding being adequately reduced. By using the tool 60 in the printing operation, cost reduction and shorter delivery date may be achieved with fabric products conventionally produced by the silk-screen printing. This modified example may allow duplex printing to be applied to production of various two-dimensional fashion items, such as scarves and handkerchiefs.

Figure 7C:
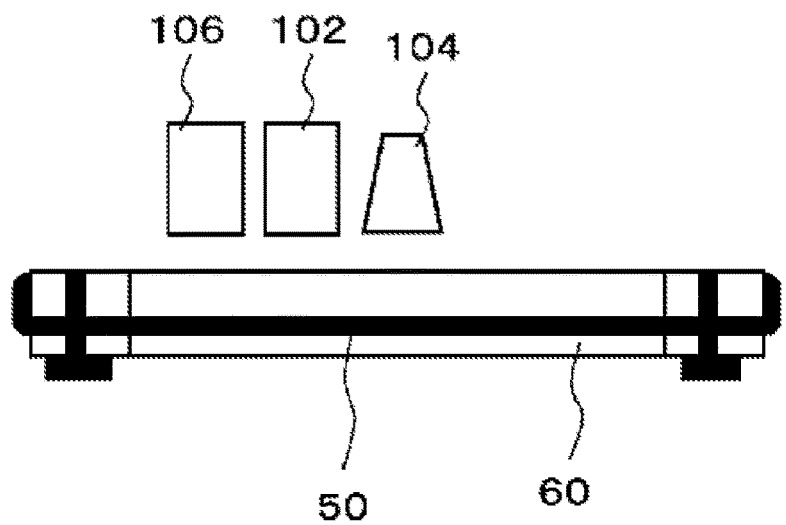

When dye-containing inks are used in this modified example, treatments may be additionally applied, if necessary, for example, heating or steaming the medium 50 for color development and fixation of dye and/or washing the medium 50 with water. For example, the fabric medium 50 may be coated with a pretreatment agent in the printing operation. In this instance, an inkjet head 106 for pretreatment may be further used to eject droplets of pretreatment agent-containing ink, as illustrated in FIG. 7(c). When, for example, ink that requires pretreatment for the medium 50 is used in the inkjet heads 102 (for example, aqueous dye ink likely to bleed), the inkjet head 106 may desirably be used to coat the medium 50 with a pretreatment agent beforehand, if necessary. Another modified example may further use an inkjet head that ejects droplets of ink containing an auxiliary agent for dye used as colorant.

Hereinafter, additional remarks are given in relation to the technical aspects described thus far. So far were described means and operations to print color images using YMCK four color inks. The basic color inks for color expression may include other inks in addition to the YMCK color inks. For example, the YMCK four color inks and the RGB color inks, which are seven color inks in total, may be at least used for color expression. This may allow a diverse range of colors to be expressed with reduced amounts of inks and further allow each color to be expressed more vividly. Therefore, these seven color inks may desirably be used to express diverse colors in duplex printing using the fabric medium 50.

When these seven color inks are used, inkjet heads for RGB colors may be disposed adjacent to the inkjet heads for YMCK colors in the main scanning direction (Y direction). The inkjet heads for RGB colors may be displaced from the inkjet heads for YMCK colors in the sub scanning direction (X direction). In these instances, the ultraviolet light sources may be disposed in accordance with positions of the inkjet heads. The positions of the ultraviolet light sources in the sub scanning direction may be displaced from positions of the inkjet heads in a direction in which ultraviolet is radiated for the ejected ink droplets (behind the inkjet heads).

In addition to the inkjet heads for the basic colors including the YMCK or YMCKRGB colors, inkjet heads for colors other than these colors may be additionally used, for example, inkjet heads for feature colors such as orange, white, yellowish green, indigo, and/or metallic (silver) colors.

The ultraviolet light radiated toward ink that just landed on the medium 50 may have a wavelength, for example, between approximately 250 nm and 400 nm in accordance with a range of intense absorption wavelengths of the ultraviolet absorbent. The irradiation intensity of ultraviolet light on the medium 50 may be approximately greater than or equal to 0.5 W/cm$^2$, or desirably approximately greater than or equal to 2 W/cm$^2$. Such ultraviolet irradiation intensity may allow the ink to be dried in short time.

The ultraviolet irradiation energy required to dry the ink may be approximately 0.05 to 5 Joule/cm$^2$, or desirably approximately 0.8 to 1.5 joule/cm$^2$. Therefore, the ultraviolet irradiation energy may be set to approximately 0.05 to 5 Joule/cm$^2$, or desirably approximately 0.5 to 2 Joule/cm$^2$ or approximately 0.8 to 1.5 Joule/cm$^2$. The magnitude of ultraviolet irradiation energy required to dry the ink may increase with higher boiling points of the ink solvent. As the ultraviolet irradiation intensity is weaker and the irradiation time is correspondingly longer, more thermal energy is lost through the medium 50, which requires greater ultraviolet irradiation energy. The intensity and energy of ultraviolet irradiation toward the medium 50 may be optimally set in view of these factors.

The ultraviolet absorbent-containing ink instantaneously heated and dried under ultraviolet radiation may be UV instantaneous heating ink for textile printing. The ultraviolet absorbent-containing ink described so far is mostly dried under heat generated by the ultraviolet absorbent itself. For improved drying efficiency using ultraviolet radiation, the ink may further contain a monomer and/or an oligomer that generates heat through a polymerization reaction.

In this instance, the ultraviolet absorbent may be a material that allows the monomer or oligomer to initiate the polymerization reaction in response to ultraviolet light (UV curing initiator or UV polymerization initiator). Examples of ultraviolet absorbent (UV curing initiator) may include cationic UV curing initiators and radical UV curing initiators, for example, acetopheminone-based UV curing initiators, α-aminoacetophenone-based UV absorbents, acylphosphine oxide radical-based UV absorbents, O-acyloxime-based UV absorbents, titanocene-based UV curing initiators, and bimolecular-reactive UV curing initiators.

Examples of the monomer and the oligomer may include monomers and oligomers transformed into aqueous resins through heat-generating polymerization reactions (polymerization exothermic reaction). In addition to these materials, the ink may contain a dye as colorant. A monomer or an oligomer may be used as latex resin or color resin of the ink. The ink having such a composition may generate heat of polymerization under ultraviolet radiation. Such ink may be more efficiently heated to higher temperatures and dried.

Specific examples of components and composition of the ink that induce the polymerization exothermic reaction may include the following; monomers such as dipropylene diacrylate, isobonyl acrylate, and methoxybutyl acrylate, and/or oligomers such as polyester acrylate, epoxy acrylate, and urethane acrylate. Such a monomer and/or oligomer may be added to a solvent primarily consisting of water and a high-boiling solvent as a UV-polymerizable material that generates a radical polymerization reaction. For cationic polymerization, ink may contain 15 to 50 wt. % of epoxy, vinylether, or oxetane to the total ink weight. Examples of the ultraviolet absorbent for radical polymerization may include acetophenone-based and acyloxime-based ultraviolet absorbents. An ultraviolet absorbent that generates acid under light may be used for cationic polymerization. The ultraviolet absorbent may be selected from suitable materials that effectively absorb ultraviolet light emitted from the ultraviolet light sources such as UVLED. The ink may contain approximately 5 to 10 wt. % of the ultraviolet absorbent. The monomer and/or oligomer being added is not intended to cure the ink but is intended to generate heat that dries the ink. Therefore, the ink may contain approximately 0.01 to 10 wt. % of the ultraviolet absorbent depending on contents of the monomer and/or oligomer, or may desirably contain approximately 0.05 to 3 wt. %, approximately 0.05 to 2 wt. %, approximately 0.05 to 1 wt. %, or approximately 0.1 to 0.4 wt. % of the ultraviolet absorbent. The ink may contain, as colorant, approximately 2 to 10 wt. % of a pigment or disperse dye, both of a pigment and disperse dye, or one selected from different types of dyes. An agent that adjusts surface tension or viscosity may be further added to the ink.

When the fabric medium 50 is used and required to have softness and wash-fastness after printing, ink desirably used may contain resin serving as binder. Examples of such a binder resin may include urethane resins, epoxy resins, mixture of urethane and epoxy resins, and any one(s) of components generated through the polymerization reaction.

As described earlier, an aqueous solvent, such as water, may be suitably used when the fabric medium 50 is the print target medium. In case any organic solvent but water is used as the solvent's principal component, a safe organic solvent substantially harmless to human may desirably be used. Examples of the solvent suitably used may include isoparafin-based materials, ethyleneglycol monobutyl ether-acetate (BMGAC), ethyleneglycol monopropyl ether, diethyleneglycol monobutyl ether (BDG), diethyelenglycol ethylmethyl ether (EDM), diethyelenglycol diethyl ether (EDE), propyleneglycol monomethyl ether acetate (PMA), dipropyleneglycol monomethyl ether (DPGME), dipropyleneglycol dimethyl dimethyl ether, butyl acetate, and 3-methoxybutyl acetate. The solvent may primarily consist of a high-boiling solvent having a boiling point higher than 110° C. Such ink may be prevented from drying in nozzles of the inkjet heads.

To instantaneously dry the ink under ultraviolet radiation, the content (loading) of the ultraviolet absorbent in the ink may be approximately 0.01 to 10 wt. % (desirably 0.05 to 3 wt. %, 0.05 to 2 wt. %, 0.05 to 1 wt. %, or 0.1 to 0.4 wt. %. A known example of the ink containing a material that absorbs ultraviolet light, like ultraviolet absorbents, may be ultraviolet-curable ink curable by under ultraviolet radiation. A specific example of the material that absorbs ultraviolet light in the ultraviolet-curable ink may be a polymerization initiator. When the ultraviolet absorbent is added to ink in order to instantaneously dry the ink, a range of contents of the ultraviolet absorbent differs from a range of contents of the initiator added to the known ultraviolet-curable inks. This is hereinafter described in detail.

Figure 8A:
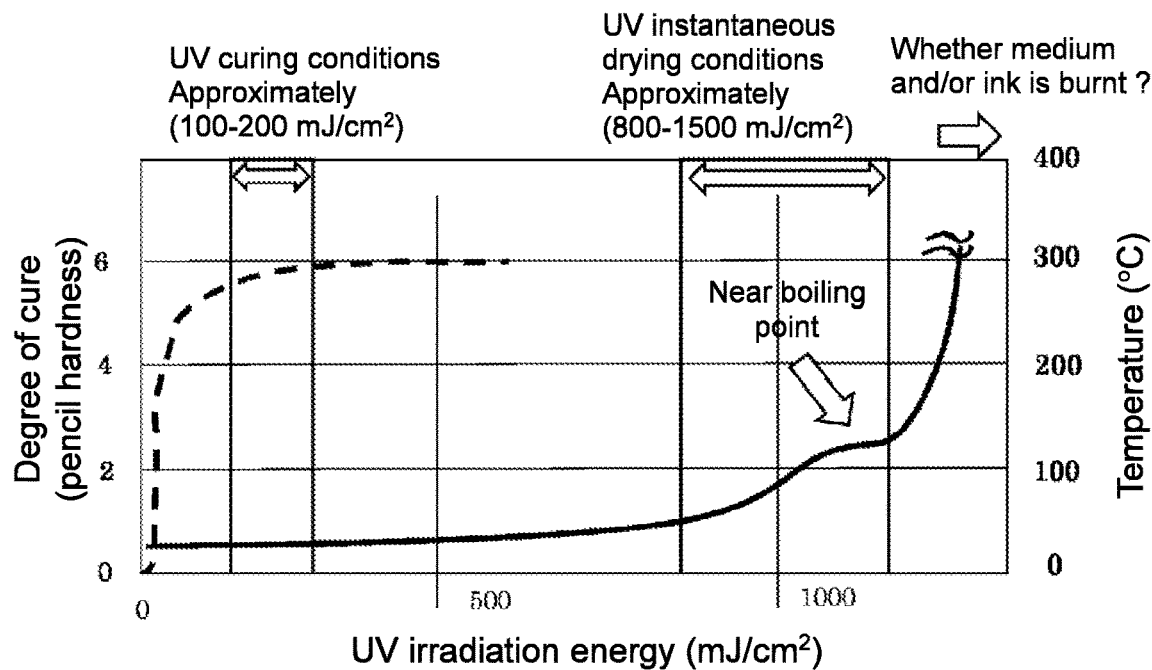
FIGS. 8(a) to 8(c) are drawings that illustrate conditions for ink drying under ultraviolet radiation.
Figure 8B:
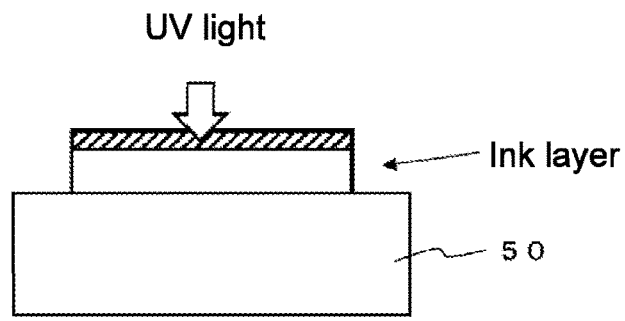
Figure 8C:
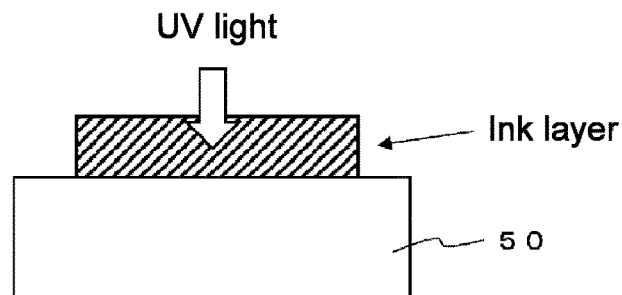

FIGS. 8(a) to 8(c) are drawings that illustrate conditions for ink drying under ultraviolet radiation. FIG. 8(a) is a drawing that illustrates the energy of ultraviolet radiation toward ink. In this drawing, conditions for instantaneous ink drying using ultraviolet radiation (UV instantaneous drying conditions) are compared to conditions for curing the known ultraviolet-curable ink (UV curing conditions).

In a graph illustrated in FIG. 8(a), a curve drawn with a solid line indicates a relationship between ultraviolet (UV) irradiation energy and temperatures of ink illustrated on the right side of the graph when ink is instantaneously dried under ultraviolet radiation. The ultraviolet irradiation energy refers to the energy of ultraviolet radiation toward ink on the medium from the ultraviolet light sources such as UVLED (magnitude of energy per unit area). A curve drawn with a broken line indicates a relationship between ultraviolet irradiation energy and degrees of cure illustrated on the left side of the graph when a known ultraviolet-curable ink is used.

As is clear from the description so far, any events associated with ultraviolet radiation used to instantaneously dry ink differ from events when an ultraviolet-curable ink is cured. Therefore, there is naturally a distinction between ranges of ultraviolet irradiation energy desirably used to dry these inks. To cure an ultraviolet-curable ink, the ultraviolet irradiation energy may be approximately 100 to 200 mJ/cm$^2$ (approximately 0.1 to 0.2 Joule/cm$^2$). To instantaneously dry ink under ultraviolet radiation, the ultraviolet irradiation energy may be approximately 800 to 1,500 mJ/cm$^2$ (approximately 0.8 to 1.5 Joule/cm$^2$). Therefore, energy approximately 10 times larger than that of the ultraviolet-curable ink may be a required magnitude of energy to instantaneously dry ink under ultraviolet radiation.

When a solvent is evaporating in ink being heated to be instantaneously dried under ultraviolet radiation, temperature rise of the ink ceases when a temperature close to the solvent boiling point is reached as indicated by an arrow in the graph. The ultraviolet irradiation, if continued even after the ink is fully dried, may continue to elevate the ink temperature to an extent that the ink and the medium may be burned. To instantaneously dry ink under ultraviolet radiation, the ink may be heated in a manner that avoids overheating that may consequently burn the ink and the medium.

To heat the ink in this manner, the whole ink may desirably be heated at once to the extent possible, instead of the ink surface alone being dried. To prevent the ink surface alone from being dried, the content of an ultraviolet absorbent in the ink may desirably be less than, for example, the content of an initiator in an ultraviolet-curable ink.

FIGS. 8(b) and 8(c) are drawings that illustrate a relationship between the content of an ultraviolet absorbent and the rate of absorption of ultraviolet light. FIG. 8(b) is a schematic drawing of how ultraviolet light is absorbed by a large content of ultraviolet absorbent (ultraviolet absorbent added at a high concentration). FIG. 8(c) is a schematic drawing of how ultraviolet light is absorbed by a small content of ultraviolet absorbent (ultraviolet absorbent added at a low concentration). In FIGS. 8(b) and 8(c) illustrated in relation to a temperature distribution in an ink layer irradiated with intense ultraviolet light. In this drawing, part of the ink layer heated to higher temperatures immediately after ultraviolet radiation started is illustrated in a hatched pattern.

To dry ink under ultraviolet radiation, the ink may desirably be irradiated with intense ultraviolet light having a large energy per unit area and thereby instantaneously dried. When an ultraviolet absorbent is used at a high concentration as illustrated in FIG. 8(b), ultraviolet light (UV light) toward ink on the medium 50 may be mostly absorbed into the vicinity of the surface of the ink layer. Then, intense ultraviolet light may rapidly elevate the ink layer surface alone to higher temperatures, eventually drying the surface alone. The inner side of the ink layer is yet to be fully dried and should be further irradiated with ultraviolet light for full cure. Such intense ultraviolet irradiation after the solvent on the ink layer surface is evaporated may be likely to burn the ink layer. The ink layer dried on its surface alone may become a coating film formed on the surface. The coating film covering the ink inside of the ink layer may decelerate the drying rate of solvent inside. If ultraviolet radiation is continued after the ink layer surface is dried, the solvent remains inside for an extended time, making it difficult to dry the ink in short time.

When an ultraviolet absorbent is used at a low concentration as illustrated in FIG. 8(c), the ultraviolet absorbent may be less absorbed on the ink layer surface, allowing ultraviolet light to penetrate further into the ink layer. As a result, ultraviolet light may be absorbed into the whole ink layer, and the whole ink layer is heated evenly to higher temperatures. Thus, the whole ink layer may be evenly and optimally heated by using the ultraviolet absorbent at a low concentration. Then, intense ultraviolet radiation may allow the whole ink layer to be instantaneously dried.

As mentioned earlier, the content of the ultraviolet absorbent in the ink may be 0.01 to 10 wt. %, or desirably 0.05 to 3 wt. %, 0.05 to 2 wt. %, 0.05 to 1 wt. %, or 0.1 to 0.4 wt. % to the total ink weight. The inventors of this invention confirmed an optimal content value of ultraviolet absorbents such as TINUVIN 400 and TINUVIN 460, which was approximately 0.5 wt. % (0.3 to 0.7 wt. %).

As mentioned earlier, ultraviolet-absorbable materials are included in the known ultraviolet-curable inks as polymerization initiators. When the ink is instantaneously dried under ultraviolet radiation, a range of contents of the ultraviolet absorbent to be added differs from a range of contents of the initiator added to the known ultraviolet-curable inks. When the solvent is remaining in ink being heated to be dried under ultraviolet radiation as illustrated in the graph of FIG. 8(a), temperature rise of the ink ceases when a temperature close to the solvent boiling point is reached. Therefore, even intense ultraviolet radiation may be unlikely to burn the ink. On the other hand, an ultraviolet-curable ink, if irradiated with intense ultraviolet light, is immediately heated to higher temperatures and is possibly burnt.

As in the UV curing conditions shown on the graph of FIG. 8(a), an ultraviolet-curable ink is usually irradiated with weak ultraviolet light. Therefore, the concentration of a polymerization initiator to be added should be adequately high in order to fully cure the ink under ultraviolet radiation.

With a small energy of ultraviolet radiation at the time, ultraviolet light being intensely absorbed in the vicinity of the surface may not burn the ink. When an ultraviolet-curable ink radically polymerizable is used, the surface of its ink layer may be cured in an early stage in order to avoid poor curing due to ambient oxygen. Thus, an improved degree of cure may be attainable. In this instance, the concentration of a polymerization initiator to be added may desirably be higher.

Because of different conditions demanded, a range of contents of the ultraviolet absorbent to be added to instantaneously cure the ink under ultraviolet radiation differs from a range of contents of the polymerization initiator in the known ultraviolet-curable inks. The content of the ultraviolet absorbent to be added to instantaneously dry the ink may be set to be smaller than the content of the polymerization initiator in the known ultraviolet-curable inks.

INDUSTRIAL APPLICABILITY

This invention is suitably applicable to printing apparatuses.

The invention claimed is:

1. A printing apparatus that carries out a printing operation for a medium by an inkjet scheme, the printing apparatus comprising:
an inkjet head that ejects a droplet of an ink by the inkjet scheme; and
an ultraviolet light source that radiates an ultraviolet light,
wherein the ink comprising an ultraviolet absorbent that absorbs the ultraviolet light to generate heat, and a solvent that dissolves or disperses the ultraviolet absorbent,
the ink ejected from the inkjet head being adherable to the medium and fixable by evaporating the solvent,
the ultraviolet light source irradiating the ink adhered to the medium with the ultraviolet light to an extent that the medium and the ink are not burnt or discolored, so as to volatilize and remove at least part of the solvent from the ink with the heat generated by the ultraviolet absorbent, and to increase a viscosity of the ink to a degree that does not bleed on the medium.

2. The printing apparatus as set forth in claim 1, wherein the ultraviolet light source radiates the ultraviolet light toward the ink on outside of a region of the medium facing the inkjet head.

3. The printing apparatus as set forth in claim 1, wherein the ultraviolet light source heats the ink by radiating the ultraviolet light so that a continuous irradiation time for a position on the medium is smaller than a thermal time constant of heat dissipation from the medium.

4. The printing apparatus as set forth in claim 1, further comprising:
a heater that heats the medium,
wherein the ultraviolet light source irradiates the ink on the medium heated by the heater with the ultraviolet light, and
the ultraviolet light source, in combination with the heater, volatilizes and removes at least part of the solvent included in the ink.

5. The printing apparatus as set forth in claim 1, wherein the ink comprises 0.05 wt. % to 2 wt. % of the ultraviolet absorbent.

6. The printing apparatus as set forth in claim 1, wherein the ultraviolet absorbent is one selected from benzotriazole-based ultraviolet absorbents, liquid ultraviolet absorbents, triazine-based ultraviolet absorbents, benzophenone-based ultraviolet absorbents, benzoate-based ultraviolet absorbents, and benzimidazole-based ultraviolet absorbents.

7. The printing apparatus as set forth in claim 1, wherein the ultraviolet light source is a light source using a semiconductor that generates the ultraviolet light.

8. The printing apparatus as set forth in claim 1, wherein the medium has absorbency for the ink before the solvent is volatilized and removed.

9. The printing apparatus as set forth in claim 1, wherein the medium is a fabric medium, and
the printing apparatus carries out the printing operation for both surfaces of the medium.

10. The printing apparatus as set forth in claim 9, wherein the ink comprises a pigment as colorant.

11. The printing apparatus as set forth in claim 9, wherein the ink comprises a dye as colorant.

12. The printing apparatus as set forth in claim 11, wherein
the ink further comprises an auxiliary agent that assists color development of the dye.

13. The printing apparatus as set forth in claim 11, further comprising:
a second inkjet head that ejects a droplet of an ink comprising an auxiliary agent that assists color development of the dye.

14. The printing apparatus as set forth in claim 1, wherein the viscosity is greater than or equal to 50 mPa·s.

15. The printing apparatus as set forth in claim 1, wherein
the ink fixed to the medium is heated to 100° C. to 170° C., and
the ultraviolet irradiation energy of the ultraviolet light is set to 0.05 Joule/cm² to 5 Joule/cm².

16. The printing apparatus as set forth in claim 1, wherein
the ultraviolet irradiation energy of the ultraviolet light is set to 0.5 Joule/cm² to 2 Joule/cm².

17. The printing apparatus as set forth in claim 1, wherein
the ultraviolet irradiation energy of the ultraviolet light is set to 0.8 Joule/cm² to 1.5 Joule/cm².

18. A printing method for carrying out a printing operation for a medium by an inkjet scheme, the printing method comprising:
using an inkjet head that ejects a droplet of an ink by the inkjet scheme; and
using an ultraviolet light source that radiates an ultraviolet light,
wherein
the ink comprising an ultraviolet absorbent that absorbs the ultraviolet light to generate heat, and a solvent that dissolves or disperses the ultraviolet absorbent,
the ink ejected from the inkjet head being adherable to the medium and fixable by evaporating the solvent,
the ultraviolet light source irradiating the ink adhered to the medium with the ultraviolet light to an extent that the medium and the ink are not burnt or discolored, so as to volatilize and remove at least part of the solvent from the ink with the heat generated by the ultraviolet absorbent, and to increase a viscosity of the ink to a degree that does not bleed on the medium.

* * * * *